US012730841B2

(12) United States Patent
Kunou et al.

(10) Patent No.: US 12,730,841 B2
(45) Date of Patent: Sep. 8, 2026

(54) INFORMATION PROCESSING DEVICE, INFORMATION PROCESSING METHOD, AND PROGRAM

(71) Applicant: Sony Group Corporation, Tokyo (JP)

(72) Inventors: Katsutoshi Kunou, Tokyo (JP); Akira Fukuda, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 362 days.

(21) Appl. No.: 18/570,524

(22) PCT Filed: Mar. 10, 2022

(86) PCT No.: PCT/JP2022/010642
§ 371 (c)(1),
(2) Date: Dec. 14, 2023

(87) PCT Pub. No.: WO2023/002676
PCT Pub. Date: Jan. 26, 2023

(65) Prior Publication Data

US 2024/0273135 A1 Aug. 15, 2024

(30) Foreign Application Priority Data

Jul. 21, 2021 (JP) ................................ 2021-120863

(51) Int. Cl.
*G06F 16/58* (2019.01)
*G06F 3/14* (2006.01)
*G06F 16/538* (2019.01)

(52) U.S. Cl.
CPC ................ *G06F 16/58* (2019.01); *G06F 3/14* (2013.01); *G06F 16/538* (2019.01)

(58) Field of Classification Search
CPC ........... G06F 16/58; G06F 16/538; G06F 3/14
USPC ........................................................ 382/305
See application file for complete search history.

(56) References Cited

U.S. PATENT DOCUMENTS

2007/0011152 A1* 1/2007 Ikezawa .................. G06F 16/58
2007/0250490 A1* 10/2007 Okawa .................... G06F 16/54
2010/0145982 A1* 6/2010 Iwase .................... G06F 3/0488 707/769
2022/0012297 A1* 1/2022 Basu ..................... G06F 16/583
2022/0036597 A1* 2/2022 Sugimoto ............... G06F 16/55
2022/0368957 A1* 11/2022 Hirayama ........ H04N 21/21805

FOREIGN PATENT DOCUMENTS

JP 2002300521 A 10/2002
JP 2004220420 A 8/2004
JP 2006166193 A 6/2006
JP 2007312310 A 11/2007
JP 2016004379 A 1/2016
JP 2020194302 A 12/2020

OTHER PUBLICATIONS

International Search Report (PCT/ISA/210), International Application No. PCT/JP2022/010642, dated May 31, 2022.

* cited by examiner

*Primary Examiner* — William D Titcomb
(74) *Attorney, Agent, or Firm* — Michael Best & Friedrich LLP

(57) ABSTRACT

An information processing device includes: an image search unit that searches for an image corresponding to designated time and date information among a plurality of images stored and associated with imaging times; and a display control unit that displays, on a display unit, an image based on a result of the search performed by the image search unit.

18 Claims, 23 Drawing Sheets

1
11
IMAGING OPTICAL SYSTEM
12
IMAGING ELEMENT UNIT
13
SIGNAL PROCESSING UNIT
14
STORAGE UNIT
15
DISPLAY UNIT
16
COMMUNICATION UNIT
17
CONTROL UNIT
31
IMAGING CONTROL UNIT
32
DISPLAY CONTROL UNIT
33
IMAGE SEARCH UNIT
18
DRIVER UNIT
6
MANIPULATION ELEMENT
19
AUDIO OUTPUT DEVICE

FIG. 4
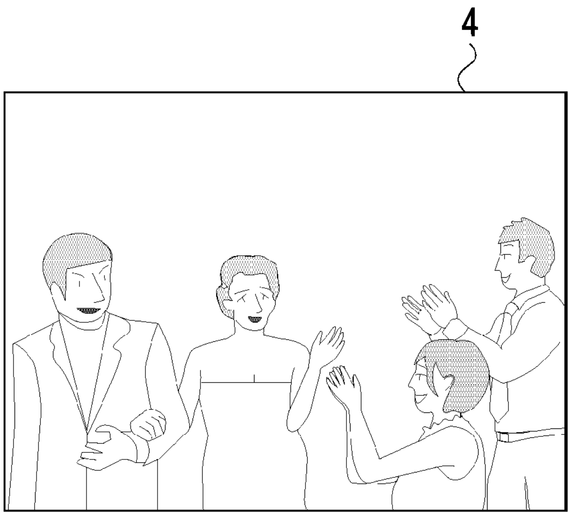
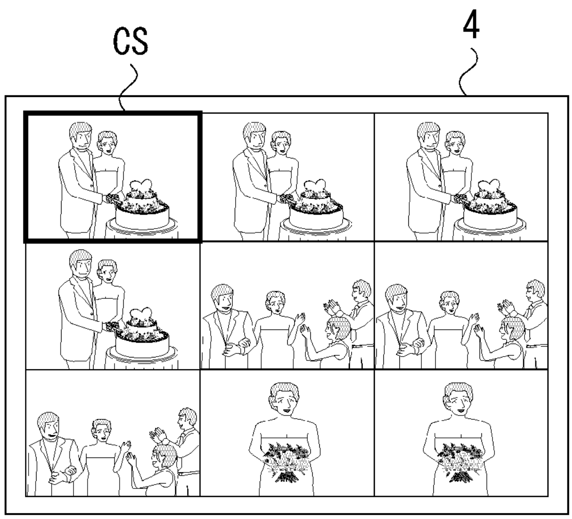

STORAGE UNIT
STILL IMAGE 1
2021/7/1
15:20:00
STILL IMAGE 2
2021/7/1
15:20:05
STILL IMAGE 3
2021/7/1
15:20:10
STILL IMAGE 4
2021/7/1
15:20:15
STILL IMAGE 5
2021/7/1
15:39:50
STILL IMAGE 6
2021/7/1
15:40:00
STILL IMAGE 7
2021/7/1
15:40:05
STILL IMAGE 8
2021/7/1
15:50:15
STILL IMAGE 9
2021/7/1
15:50:20
41
4
ENTER TIME AND DATE OF IMAGE YOU ARE SEARCHING FOR
2021 · 7 · 1 16 : 00
42
41
4
ENTER TIME AND DATE OF IMAGE YOU ARE SEARCHING FOR
2021 · 7 · 1 15 : 40
42
4

FIG. 6

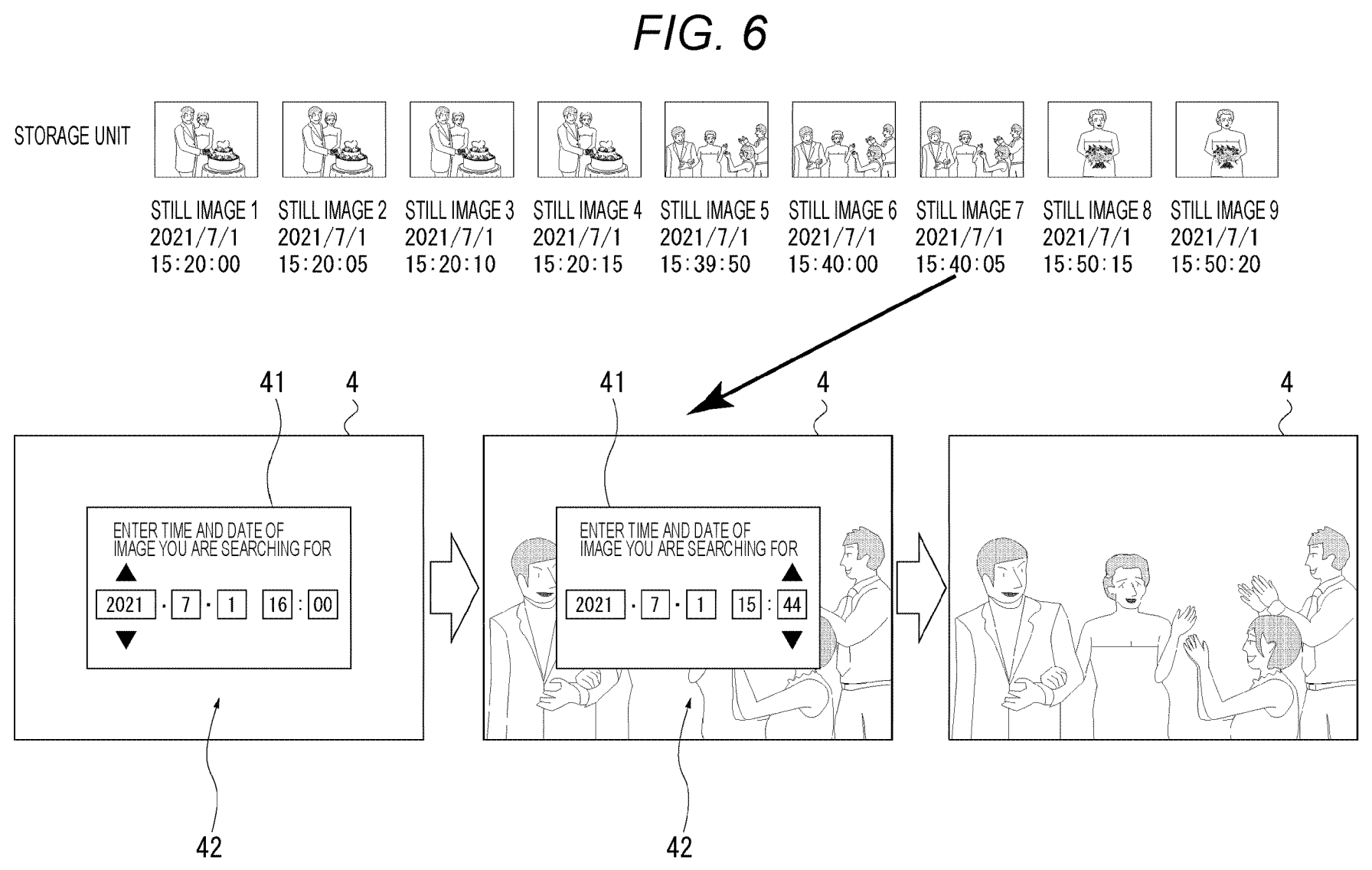

STORAGE UNIT

STILL IMAGE 1
2021/7/1
15:20:00

STILL IMAGE 2
2021/7/1
15:20:05

STILL IMAGE 3
2021/7/1
15:20:10

STILL IMAGE 4
2021/7/1
15:20:15

STILL IMAGE 5
2021/7/1
15:39:50

STILL IMAGE 6
2021/7/1
15:40:00

STILL IMAGE 7
2021/7/1
15:40:05

STILL IMAGE 8
2021/7/1
15:50:15

STILL IMAGE 9
2021/7/1
15:50:20

4

41

ENTER TIME AND DATE OF IMAGE YOU ARE SEARCHING FOR

2021 · 7 · 1 16 : 00

42

4

41

ENTER TIME AND DATE OF IMAGE YOU ARE SEARCHING FOR

2021 · 7 · 1 15 : 44

42

4

STORAGE UNIT
STILL IMAGE 1
2021/7/1
15:20:00
STILL IMAGE 2
2021/7/1
15:20:05
STILL IMAGE 3
2021/7/1
15:20:10
STILL IMAGE 4
2021/7/1
15:20:15
STILL IMAGE 5
2021/7/1
15:39:50
STILL IMAGE 6
2021/7/1
15:40:00
STILL IMAGE 7
2021/7/1
15:40:05
STILL IMAGE 8
2021/7/1
15:50:15
STILL IMAGE 9
2021/7/1
15:50:20
4
41
4
ENTER TIME AND DATE OF IMAGE YOU ARE SEARCHING FOR
2021 · 7 · 1 15 : 20
42
41
4
ENTER TIME AND DATE OF IMAGE YOU ARE SEARCHING FOR
2021 · 7 · 1 15 : 40
42

STORAGE UNIT
STILL IMAGE 1
2021/7/1
15:20:00
STILL IMAGE 2
2021/7/1
15:20:05
STILL IMAGE 3
2021/7/1
15:20:10
STILL IMAGE 4
2021/7/1
15:20:15
STILL IMAGE 5
2021/7/1
15:39:50
STILL IMAGE 6
2021/7/1
15:40:00
STILL IMAGE 7
2021/7/1
15:40:05
STILL IMAGE 8
2021/7/1
15:50:15
STILL IMAGE 9
2021/7/1
15:50:20
CS
4
CS
41
4
ENTER TIME AND DATE OF
IMAGE YOU ARE SEARCHING FOR
2021 · 7 · 1 15 : 20
42
41
4
ENTER TIME AND DATE OF
IMAGE YOU ARE SEARCHING FOR
2021 · 7 · 1 15 : 50
CS
42

STORAGE UNIT
STILL IMAGE 1
2021/7/1
15:20:00
STILL IMAGE 2
2021/7/1
15:20:05
STILL IMAGE 3
2021/7/1
15:20:10
STILL IMAGE 4
2021/7/1
15:20:15
STILL IMAGE 5
2021/7/1
15:39:50
STILL IMAGE 6
2021/7/1
15:40:00
STILL IMAGE 7
2021/7/1
15:40:05
STILL IMAGE 8
2021/7/1
15:50:15
STILL IMAGE 9
2021/7/1
15:50:20
4
41
4
ENTER TIME AND DATE OF IMAGE YOU ARE SEARCHING FOR
2021 · 7 · 1 15 : 20
42
41
4
ENTER TIME AND DATE OF IMAGE YOU ARE SEARCHING FOR
2021 · 7 · 1 15 : 40
42

STORAGE UNIT
STILL IMAGE 1
2021/7/1
15:20:00
STILL IMAGE 2
2021/7/1
15:20:05
STILL IMAGE 3
2021/7/1
15:20:10
STILL IMAGE 4
2021/7/1
15:20:15
STILL IMAGE 5
2021/7/1
15:39:50
STILL IMAGE 6
2021/7/1
15:40:00
STILL IMAGE 7
2021/7/1
15:40:05
STILL IMAGE 8
2021/7/1
15:50:15
STILL IMAGE 9
2021/7/1
15:50:20
4
41
42
ENTER TIME AND DATE OF IMAGE YOU ARE SEARCHING FOR
2021 · 7 · 1 15 : 20
ENTER TIME AND DATE OF IMAGE YOU ARE SEARCHING FOR
2021 · 7 · 1 15 : 40

STORAGE UNIT
STILL IMAGE 1
2021/7/1
15:20:00
STILL IMAGE 2
2021/7/1
15:20:05
STILL IMAGE 3
2021/7/1
15:20:10
STILL IMAGE 4
2021/7/1
15:20:15
15:40:00
MOVING IMAGE 1
2021/7/1
15:39:50 TO 15:40:05
STILL IMAGE 8
2021/7/1
15:50:15
STILL IMAGE 9
2021/7/1
15:50:20
4
41
4
41
4
ENTER TIME AND DATE OF
IMAGE YOU ARE SEARCHING FOR
2021 · 7 · 1 15 : 20
ENTER TIME AND DATE OF
IMAGE YOU ARE SEARCHING FOR
2021 · 7 · 1 15 : 40
42
42

FIG. 18

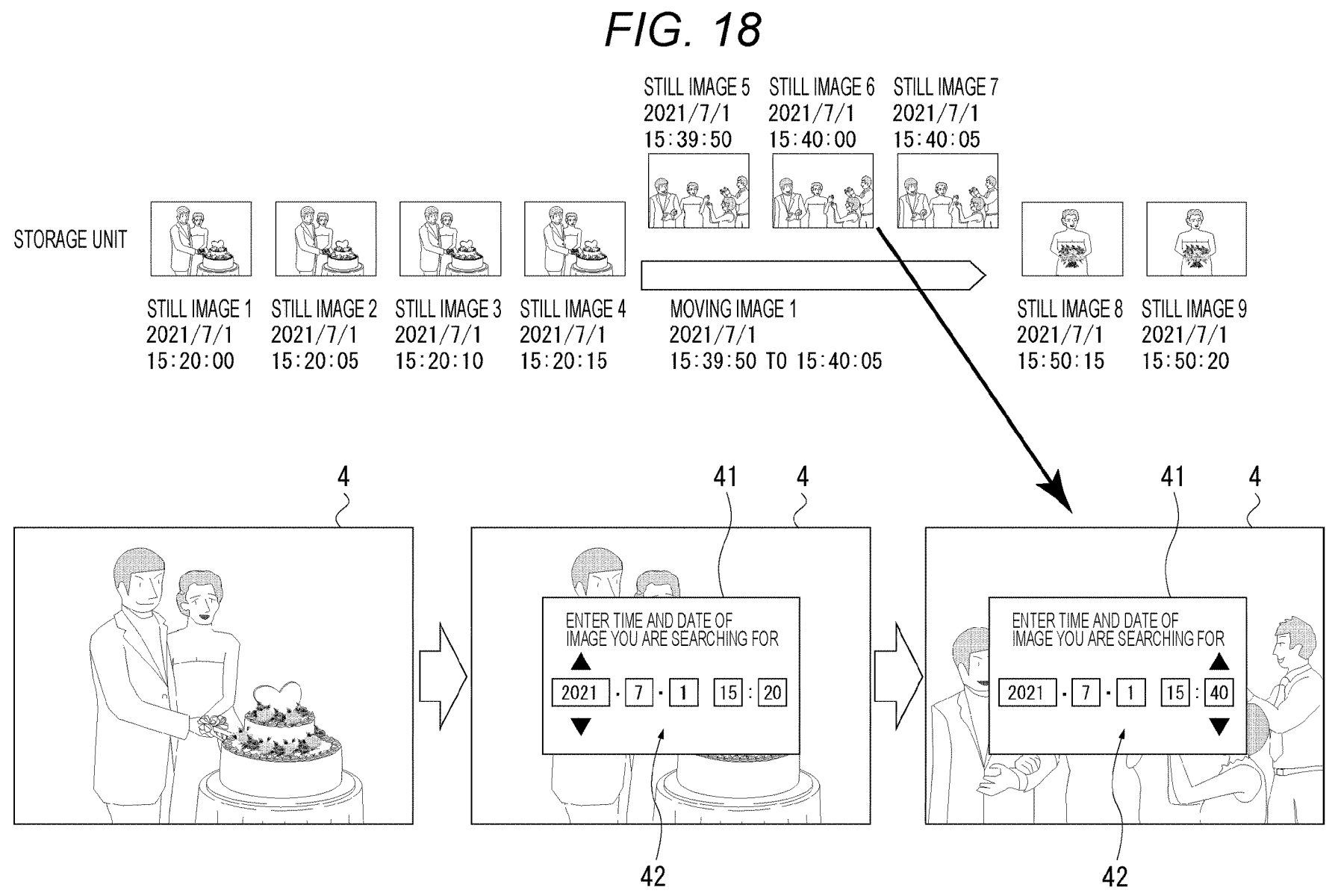

STORAGE UNIT

STILL IMAGE 1
2021/7/1
15:20:00

STILL IMAGE 2
2021/7/1
15:20:05

STILL IMAGE 3
2021/7/1
15:20:10

STILL IMAGE 4
2021/7/1
15:20:15

STILL IMAGE 5
2021/7/1
15:39:50

STILL IMAGE 6
2021/7/1
15:40:00

STILL IMAGE 7
2021/7/1
15:40:05

MOVING IMAGE 1
2021/7/1
15:39:50 TO 15:40:05

STILL IMAGE 8
2021/7/1
15:50:15

STILL IMAGE 9
2021/7/1
15:50:20

4

4

41

ENTER TIME AND DATE OF
IMAGE YOU ARE SEARCHING FOR

2021 · 7 · 1 15 : 20

42

4

41

ENTER TIME AND DATE OF
IMAGE YOU ARE SEARCHING FOR

2021 · 7 · 1 15 : 40

42

43
4
ENTER TIME AND DATE OF IMAGE YOU ARE SEARCHING FOR
2021 · 7 · 1
44
41
4
ENTER TIME AND DATE OF IMAGE YOU ARE SEARCHING FOR
2021 · 7 · 1 16 : 50
42
41
4
ENTER TIME AND DATE OF IMAGE YOU ARE SEARCHING FOR
2021 · 7 · 1 16 : 55
42
NUMBER OF IMAGES
0 1 2 13 14 15 16 17 18 21 22 23
TIME PERIOD

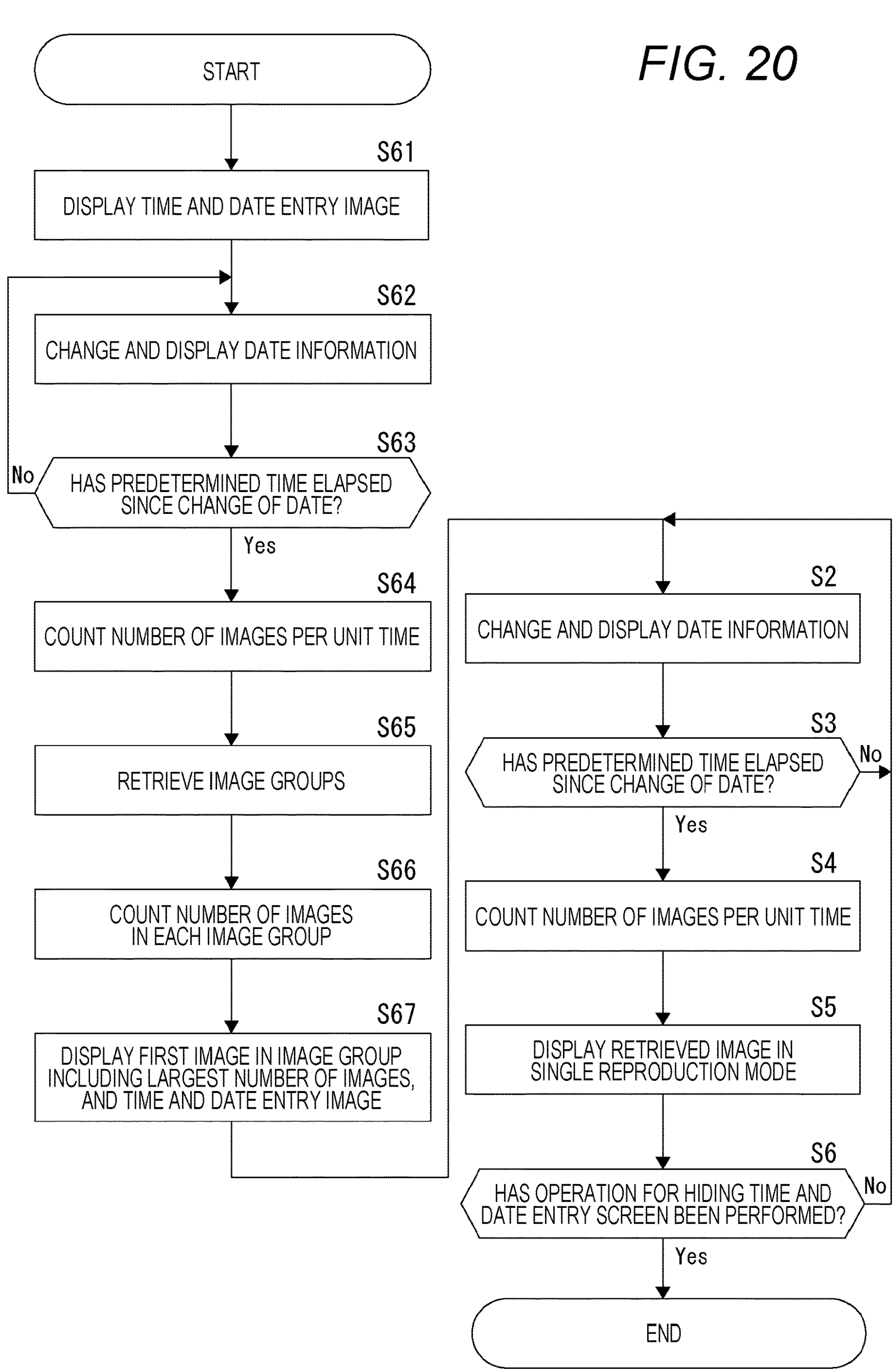
FIG. 20
START
S61
DISPLAY TIME AND DATE ENTRY IMAGE
S62
CHANGE AND DISPLAY DATE INFORMATION
S63
HAS PREDETERMINED TIME ELAPSED SINCE CHANGE OF DATE?
No
Yes
S64
COUNT NUMBER OF IMAGES PER UNIT TIME
S65
RETRIEVE IMAGE GROUPS
S66
COUNT NUMBER OF IMAGES IN EACH IMAGE GROUP
S67
DISPLAY FIRST IMAGE IN IMAGE GROUP INCLUDING LARGEST NUMBER OF IMAGES, AND TIME AND DATE ENTRY IMAGE
S2
CHANGE AND DISPLAY DATE INFORMATION
S3
HAS PREDETERMINED TIME ELAPSED SINCE CHANGE OF DATE?
No
Yes
S4
COUNT NUMBER OF IMAGES PER UNIT TIME
S5
DISPLAY RETRIEVED IMAGE IN SINGLE REPRODUCTION MODE
S6
HAS OPERATION FOR HIDING TIME AND DATE ENTRY SCREEN BEEN PERFORMED?
No
Yes
END

| 6/29 | 12 | 00 |
|---|---|---|
| 6/30 | 13 | 01 |
| 7/1 | 14 | 02 |
| 7/2 | 15 | 03 |
| 7/3 | 16 | 04 |

INFORMATION PROCESSING DEVICE, INFORMATION PROCESSING METHOD, AND PROGRAM

TECHNICAL FIELD

The present technology relates to an information processing device, an information processing method, and a program, and more particularly, to a technology for conducting an image search.

BACKGROUND ART

Conventionally, in an information processing device having an imaging function, such as a camera, an imaging time is associated with an image and is then stored. In such an information processing device, images can be displayed side by side in order of imaging, on the basis of the imaging times, for example.

Also, there are suggested information processing devices that display a list of images captured on a date and during a period of time designated by a user.

CITATION LIST

Patent Document

Patent Document 1: Japanese Patent Application Laid-Open No. 2007-312310

SUMMARY OF THE INVENTION

Problems to be Solved by the Invention

In the above information processing device, however, in a case where there are no images captured on the date and during the period of time selected by the user, any image cannot be displayed, and there is a possibility that a burden will be imposed on the user by causing the user to again input a date and a period of time or the like.

Therefore, an object of the present technology is to increase user-friendliness at a time of an image search.

Solutions to Problems

An information processing device according to the present technology includes: an image search unit that searches for an image corresponding to designated time and date information among a plurality of images stored and associated with imaging times; and a display control unit that displays, on a display unit, an image based on a result of the search performed by the image search unit.

As a result, the information processing device can compare the designated time and date information with the imaging time associated with the image, and determine that an image whose imaging time is close to the designated time and date information is a search result.

BRIEF DESCRIPTION OF DRAWINGS

FIG. 4 is a diagram illustrating reproduction modes.

FIG. 6 is a diagram for explaining the image search display process in Specific Example 1.

FIG. 18 is a diagram for explaining an image search display process in Specific Example 8.

FIG. 20 is a flowchart illustrating the flow of the image search display process in Specific Example 9.

FIG. 23 is a diagram for explaining a time and date entry image.

MODE FOR CARRYING OUT THE INVENTION

In the description below, an embodiment will be explained in the following order.

<1. Configuration of an Imaging Device>

<2. Reproduction Modes>

<3. Image Search Display Processes>

<4. Modifications>

<5. Summary>

<6. Present Technology>

1. Configuration of an Imaging Device

Figure 1:
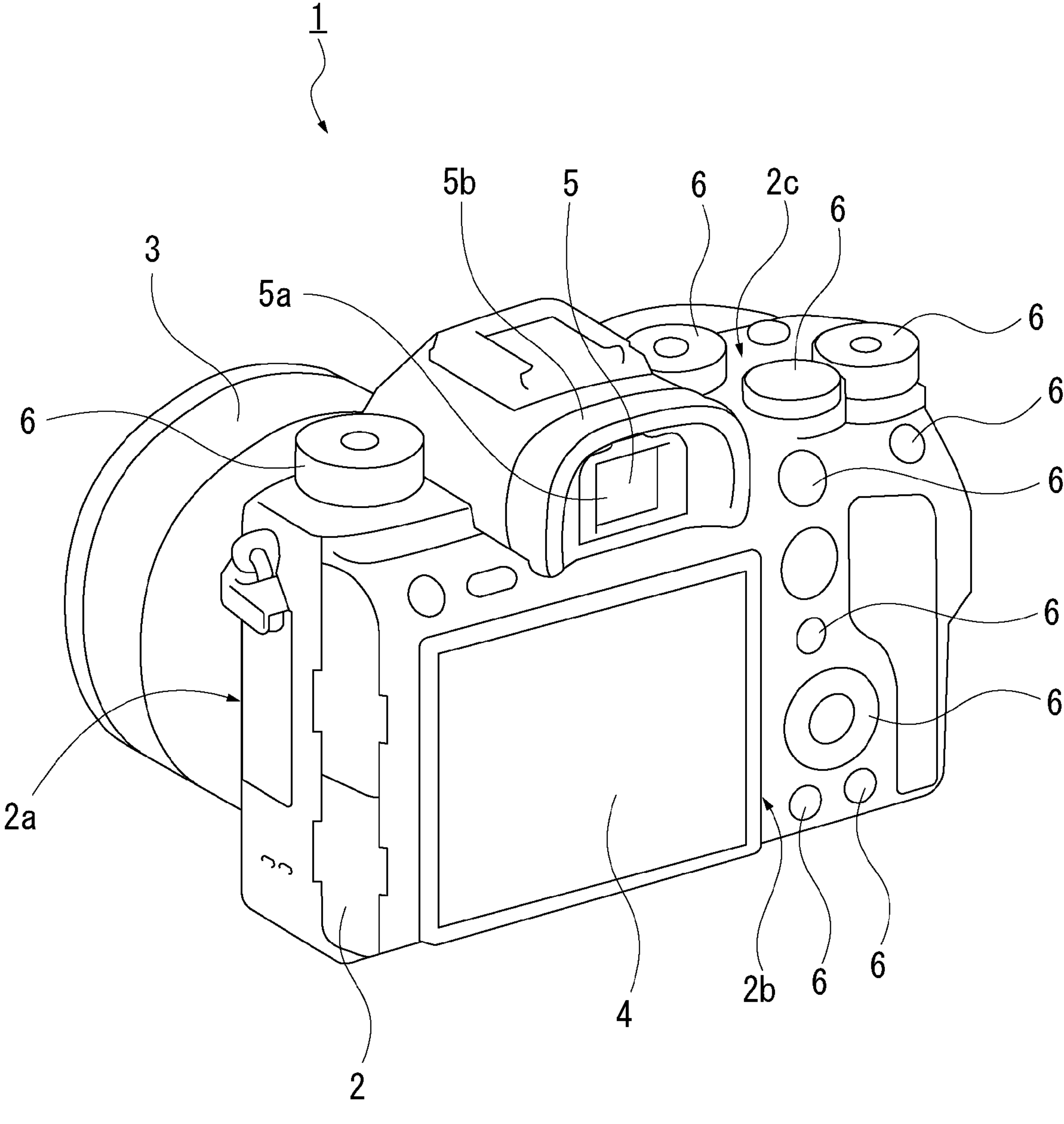
FIG. 1 is a diagram showing an external appearance of an imaging device.
Figure 2:
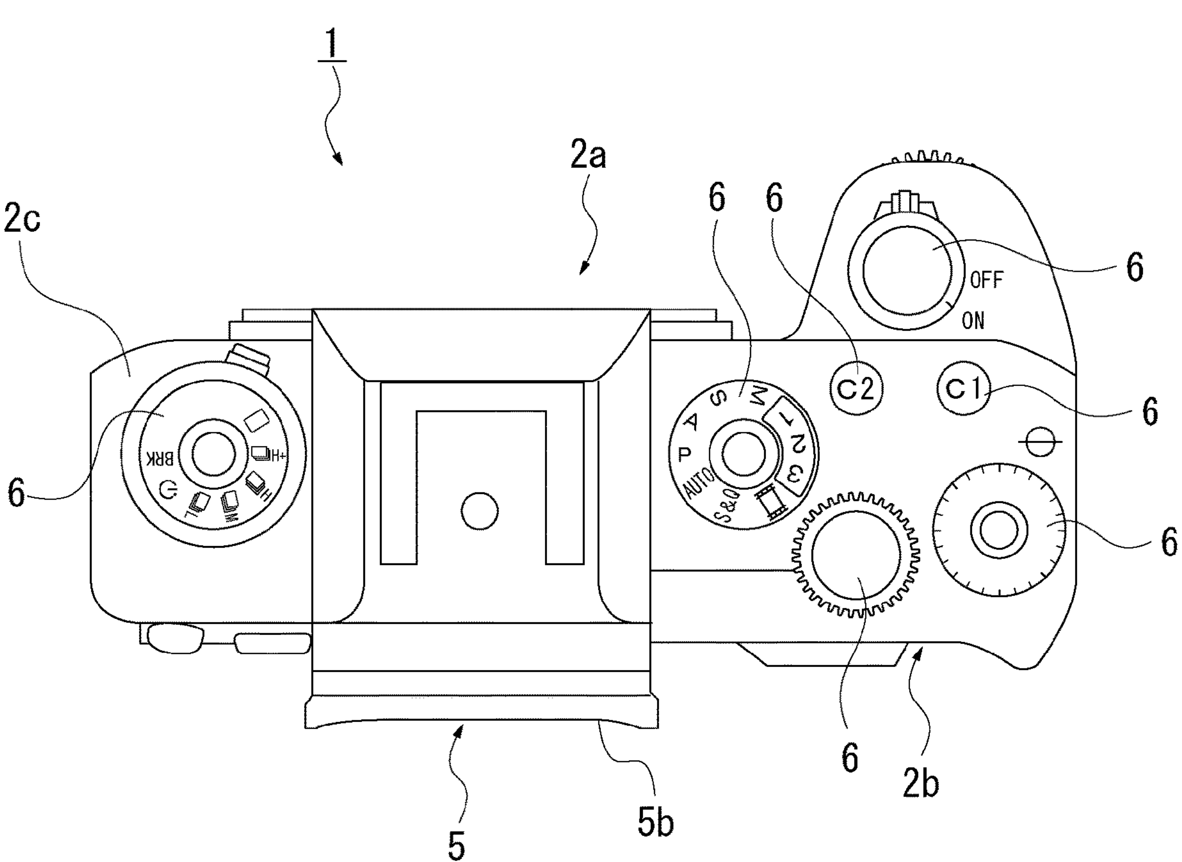
FIG. 2 is a diagram showing an external appearance of an imaging device.

FIGS. 1 and 2 are diagrams each showing an external appearance of an imaging device 1 as an example of an information processing device according to an embodiment of the present technology. FIG. 2 illustrates a camera housing 2 from which a lens barrel 3 has been removed. Note that, in the description below, the object side will be referred to as the front, and the imaging operator (user) side will be referred to as the back. Further, the information processing device illustrated in FIGS. 1 and 2 is an example of the present technology, and part of the information processing device may be included in an external apparatus connected to the information processing device in a wireless or wired manner, or may include a processing unit other than the respective components described below.

As illustrated in FIGS. 1 and 2, the imaging device 1 includes the camera housing 2 that has the respective necessary components disposed inside and outside, and the lens barrel 3 that is detachable from the camera housing 2 and is attached to a front surface portion 2*a*.

Note that the lens barrel 3 is detachable as a so-called interchangeable lens only by way of example, and may be a lens barrel that cannot be detached from the camera housing 2.

A backside monitor 4 is disposed on a back surface portion 2*b* of the camera housing 2. The backside monitor 4 displays a live view image, a reproduced image of a recorded image, or the like.

The backside monitor 4 is formed with, for example, a display device such as a liquid crystal display (LCD) or an organic electro-luminescence (EL) display.

The backside monitor 4 is rotatable with respect to the camera housing 2. For example, an upper end portion of the backside monitor 4 is set as a rotation axis, and a lower end portion of the backside monitor 4 is rotatable so as to move backward. Note that a right end portion or a left end portion of the backside monitor 4 may be used as the rotation axis. Further, it may be rotatable in directions around a plurality of axes.

An electric viewfinder (EVF) 5 is disposed on an upper surface portion 2*c* of the camera housing 2. The EVF 5 includes an EVF monitor 5*a* and a frame-like enclosing portion 5*b* projecting backward so as to surround upper, right, and left sides of the EVF monitor 5*a*.

The EVF monitor 5*a* is formed with an LCD, an organic EL display, or the like. Note that, instead of the EVF monitor 5*a*, an optical view finder (OVF) may be provided.

Various manipulation elements 6 are provided on the back surface portion 2*b* and the upper surface portion 2*c*. Examples of the manipulation elements 6 include a shutter button (release button), a reproduction menu activation button, a determination button, a cross key, a cancel button, a zoom key, a slide key, and the like.

These manipulation elements 6 include various forms such as a button, a dial, a pressing and rotatable composite manipulation element, and the like. With the manipulation elements 6 in various forms, for example, a shutter operation, a menu operation, a reproduction operation, a mode selection operation, a focus operation, a zoom operation, and a parameter change operation can be performed. Note that examples of the parameters include shutter speed, aperture value (F value), ISO sensitivity, and the like.

The manipulation elements 6 further include a touch panel provided on the front surface of the backside monitor 4.

Figure 3:
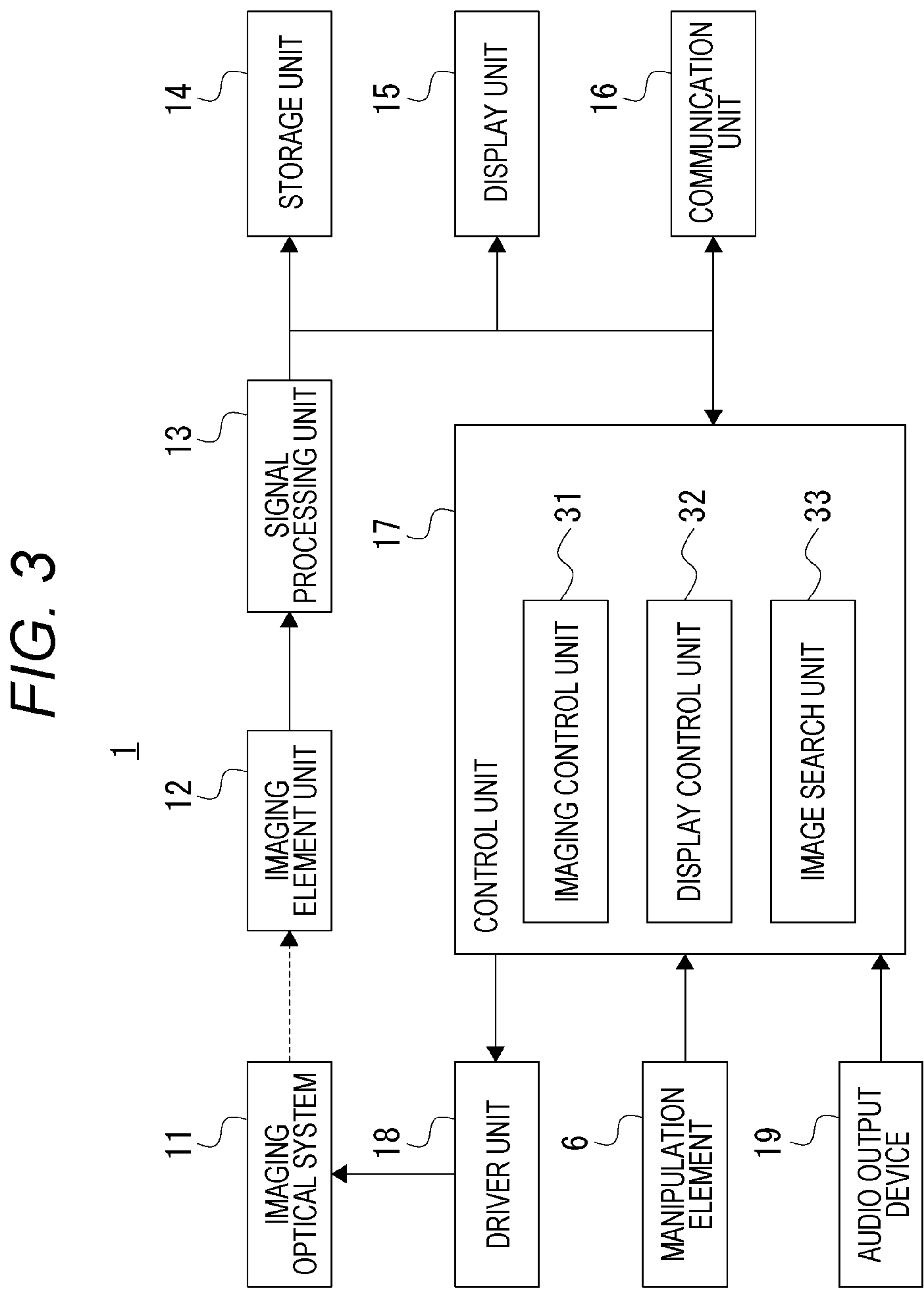
FIG. 3 is a diagram showing the internal configuration of an imaging device.

FIG. 3 is a diagram showing the internal configuration of the imaging device 1.

In the imaging device 1, light from the object enters an imaging element unit 12 via an imaging optical system 11.

In the imaging optical system 11, various lenses such as a zoom lens, a focus lens, and a condenser lens, a diaphragm mechanism, a zoom lens drive mechanism, and a focus lens drive mechanism are provided. In the imaging optical system 11, a mechanical shutter (for example, a focal plane shutter) is provided in some cases.

The imaging element unit 12 includes an image sensor of a complementary metal oxide semiconductor (CMOS) type or a charge coupled device (CCD) type, for example.

In this imaging element unit 12, a correlated double sampling (CDS) process, an automatic gain control (AGC) process, or the like, for example, is performed on an electric signal obtained by photoelectrically converting light received with the image sensor, and an analog/digital (A/D) conversion process is further performed on the electric signal. The imaging element unit 12 then outputs an imaging signal as digital data to a signal processing unit 13.

The signal processing unit 13 is formed as an image processor, such as a digital signal processor (DSP), for example. The signal processing unit 13 performs various kinds of signal processing on the input imaging signal. For example, the signal processing unit 13 performs preprocessing, a synchronization process, a YC generation process, a resolution conversion process, a file formation process, and the like.

In the preprocessing, a clamp process for clamping the black level of R, G, and B to a predetermined level, a correction process between the color channels of R, G, and B, and the like are performed on the imaging signal from the imaging element unit 12.

In the synchronization process, a color separation process is performed so that the image data of each pixel has all R, G, and B color components. For example, in the case of an image sensor using a Bayer array color filter, a demosaicing process is performed as the color separation process.

In the YC generation process, a luminance (Y) signal and a color (C) signal are generated (separated) from the image data of R, G, and B.

In the resolution conversion process, the image data subjected to various kinds of signal processing is subjected to a resolution conversion process.

In the file formation process, the image data subjected to the various kinds of processes described above is subjected to compression encoding for recording or communication, formatting, and generation or addition of metadata, for example, to generate a file for recording or communication.

For example, an image file in a format such as Joint Photographic Experts Group (JPEG), Tagged Image File Format (TIFF), or graphics interchange format (GIF) is generated as a still image file. It is also conceivable to generate an image file as an MP4 format or the like that is used for recording a moving image and sound in conformity with MPEG-4.

Note that it is also conceivable to generate an image file as raw image data.

As for metadata, the signal processing unit 13 generates metadata that includes information about processing parameters in the signal processing unit 13, various control parameters acquired from a control unit 17, information indicating operating states of the imaging optical system 11 and the imaging element unit 12, mode setting information, and information such as time and date, and place.

For example, the metadata includes the imaging time of image data, camera information such as the model, the manufacturer, and serial number of the imaging device 1, a data format, a frame rate (in the case of a moving image), a data size, angle-of-view information, parameter information for a time of imaging, and the like.

A storage unit 14 is a nonvolatile memory, for example, and stores the image file processed by the signal processing unit 13. Note that, in the description below, image data and an image file will be referred to simply as an image in some cases.

A display unit 15 performs various kinds of display for the imaging operator, and, for example, is the backside monitor 4 or the EVF monitor 5*a* disposed on the camera housing 2 of the imaging device 1 as illustrated in FIG. 1.

The display unit 15 performs various kinds of display on a display screen, on the basis of an instruction from the control unit 17.

For example, the display unit 15 displays an image based on the image file stored in the storage unit 14.

The display unit 15 also displays various operation menus, icons, messages, and the like as a graphical user interface (GUI), on the basis of an instruction from the control unit 17. Note that, although the imaging device 1 includes the display unit 15 in the present embodiment, an external apparatus (not shown) connected to the imaging device 1 in a wired or wireless manner may include the display unit 15. That is, the display unit 15 of an external apparatus may display a GUI on the basis of an instruction from the control unit 17 of the imaging device 1.

A communication unit 16 performs data communication and network communication with an external device in a wired or wireless manner.

For example, the communication unit 16 transmits and outputs an image file to and from an external information processing device, a display device, a recording device, a reproduction device, or the like.

The communication unit 16 as a network communication unit can also perform various kinds of communication over a network such as the Internet, a home network, or a local area network (LAN), for example, and perform transmission and reception of various kinds of data to and from a server, a terminal, and the like in the network.

The control unit 17 is formed with a microcomputer (arithmetic processing unit) including a central processing unit (CPU), a read only memory (ROM), and a random access memory (RAN). The control unit 17 is an information processing device that controls operations of the imaging device 1.

The RAM is used as a work area for various kinds of data processing by the CPU, to temporarily store data, programs, and the like.

The ROM is used to store an operating system (OS) for the CPU to control the respective components, application programs for various operations, firmware, various kinds of setting information, and the like.

Examples of the various kinds of setting information include communication setting information, setting information regarding an imaging operation, setting information regarding image processing, and the like. Examples of the setting information regarding an imaging operation include shutter speed, F value, ISO sensitivity, curtain speed setting of a mechanical shutter or an electronic shutter, frame rate, and the like.

The control unit 17 has functions as an imaging control unit 31, a display control unit 32, and an image search unit 33.

The imaging control unit 31 performs various kinds of control when an image is captured. For example, the imaging control unit 31 issues instructions regarding various kinds of signal processing in the signal processing unit 13, and controls imaging operations, recording operations, and the like in accordance with user operations.

The imaging control unit 31 also performs operation control on the diaphragm mechanism, control on the shutter speed of the imaging element unit 12, autofocus control, drive control on the focus lens and the zoom lens in accordance with a manual focus operation, a zoom operation, and the like, exposure timing control, and the like.

The display control unit 32 performs display control on the display unit 15 (the backside monitor 4 and the EVF monitor 5*a*). For example, the display control unit 32 causes the backside monitor 4 to display a captured image, or causes the backside monitor 4 to display a GUI for changing various kinds of settings. The display control unit 32 also displays, on the backside monitor 4, an image based on a result of a search conducted by the image search unit 33.

As will be described later in detail, the image search unit 33 searches for an image corresponding to time and date information designated via the manipulation elements 6 from among a plurality of images that is stored in the storage unit 14 and is associated with imaging times. Note that, in the present specification, an imaging time relates to the time and date on which an image was captured, and indicates "year", "month", "day", "hour", and "minute", which is the time when the image was captured, for example. A process (image search display process) to be performed by the display control unit 32 and the image search unit 33 will also be described later.

Note that, although the imaging device 1 includes the manipulation elements 6 in the present embodiment, an external apparatus (not shown) connected to the imaging device 1 in a wired or wireless manner may include the manipulation elements 6. That is, the image search unit 33 of the imaging device 1 may search for an image corresponding to time and date information designated via the manipulation elements 6 of the external apparatus.

Further, a driver unit 18 and an audio output device 19 are connected to the control unit 17.

The driver unit 18 includes a motor driver for a zoom lens drive motor, a motor driver for a focus lens drive motor, a motor driver for a diaphragm mechanism motor, and the like, for example.

In these motor drivers, a drive current is applied to the corresponding driver in accordance with an instruction from the imaging control unit 31, to move the focus lens and the zoom lens, and open and close diaphragm blades of the diaphragm mechanism, for example.

The audio output device 19 is a device that outputs sound, and is a speaker, a piezoelectric element, or the like, for example.

2. Reproduction Modes

FIG. 4 is a diagram illustrating reproduction modes. In the imaging device 1, as a method of displaying an image or images stored in the storage unit 14 on the backside monitor 4, a single reproduction mode and a list reproduction mode are adopted. In the imaging device 1, the single reproduction mode and the list reproduction mode can be switched by a predetermined operation performed on the manipulation elements 6.

As illustrated in the upper portion in FIG. 4, in the single reproduction mode, the display control unit 32 displays, on the backside monitor 4, one image among the plurality of images stored in the storage unit 14. When an operation for switching the images to be displayed is performed via the manipulation elements 6, the display control unit 32 then switches the images to be displayed in accordance with the operation performed on the manipulation elements 6, and displays the image on the backside monitor 4.

Further, as illustrated in the lower portion in FIG. 4, in the list reproduction mode, the display control unit 32 arranges a plurality of images (nine images in the example illustrated in the lower portion in FIG. 4) among the plurality of images stored in the storage unit 14 in descending order of imaging times (in chronological order of imaging), and displays a list on the backside monitor 4. The display control unit 32 also applies a cursor CS so that one of the images displayed in the list is emphasized. When an operation for switching the cursor CS is performed via the manipulation elements 6, the display control unit 32 then switches emphasized images by moving the cursor CS in accordance with the operation performed on the manipulation elements 6. Further, when an operation for placing the cursor CS on an image outside the screen is performed on the manipulation elements 6, the display control unit 32 switches images to be displayed in a list from the images currently displayed in a list to other images stored in the storage unit 14, and displays the images on the backside monitor 4.

Further, when an operation for enlarging and displaying the image on which the cursor CS is placed is performed on the manipulation elements 6, the display control unit 32 switches to the single reproduction mode, and displays, on the backside monitor 4, the one image on which the cursor CS is placed.

3. Image Search Display Processes

Next, image search display processes are described through specific examples. Note that all of the specific examples described below may be executable by the imaging device 1, or only some of the specific example may be executable by the imaging devices 1. Further, the images exemplified in the specific examples are merely examples, and may be of any kind. The number of stored images is not limited to any particular number either.

3.1 Specific Example 1

Figure 5:
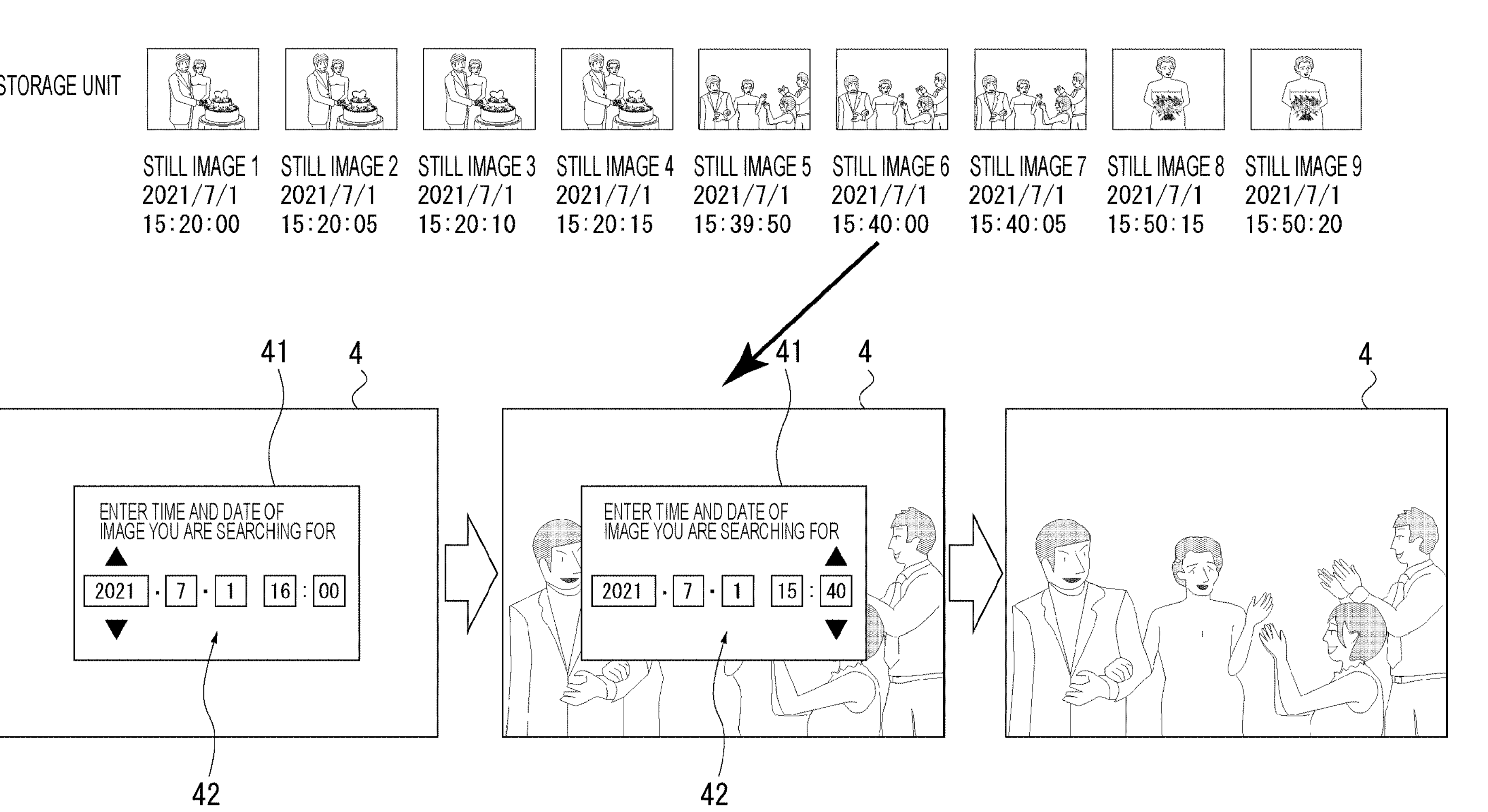
FIG. 5 is a diagram for explaining an image search display process in Specific Example 1.

FIGS. 5 and 6 are diagrams for explaining an image search display process in Specific Example 1. In Specific Example 1, it is assumed that nine still images 1 to 9 are stored in the storage unit 14, as illustrated in the upper portion in FIG. 5 and the upper portion in FIG. 6. Note that it is assumed that the still image 1 to 4 were captured between 15:20:00 and 15:20:15 on Jul. 1, 2021. Also, it is assumed that the still image 5 to 7 were captured between 15:39:50 and 15:40:05 on Jul. 1, 2021. Further, it is assumed that the still image 8 and 9 were captured between 15:50:15 and 15:50:20 on Jul. 1, 2021.

In Specific Example 1, when an operation for starting an image search display process is performed on the manipulation elements 6, the display control unit 32 displays a time and date entry image 41 for designating time and date information at the center of the backside monitor 4, as illustrated on the lower left side in FIG. 5.

The time and date entry image 41 includes a character string indicating that the time and date information for searching for an image is input, and has an entry field 42 provided for causing the user to input "year", "month", "day", "hour", and "minute". Note that, in the description below, "year", "month", "day", "hour", and "minute" provided in the entry field 42 will be sometimes referred to as entry items. The entry items may also include "second". Further, in the entry field 42, the current time and date may be displayed as default, the imaging time of the image displayed immediately before the image search display process may be displayed, any time and date may not be displayed, or any other time and date may be displayed. In a case where the current time and date or the imaging time of the image displayed immediately before the image search display process is displayed as default in the entry field 42, the user can input a time and date more easily than in a case where there is no default display.

Triangular marks indicating that the value can be changed in accordance with an upward/downward operation (for example, an operation of up and down arrow keys, an upward/downward slide operation on a touch panel, or the like) performed on the manipulation elements 6 are displayed above and below one entry item of a plurality of entry items in the entry field 42. Note that, in the example illustrated on the lower left side in FIG. 5, the triangular marks are displayed above and below the entry item "year".

When an upward/downward operation of the manipulation elements 6 is performed while the time and date entry image 41 is displayed on the backside monitor 4, the display control unit 32 changes and displays the entry item in accordance with the upward/downward operation. For example, when a downward operation is performed, the display control unit 32 changes the value of the entry item to the next value.

Further, when a rightward/leftward operation (for example, an operation of a left arrow key or a right arrow key, a slide operation in a leftward direction or a rightward direction on the touch panel, or the like) of the manipulation elements 6 is performed, the display control unit 32 changes changeable entry items in accordance with the rightward/leftward operation. For example, when a rightward operation is performed, the display control unit 32 changes the changeable entry item to the next entry item to the right, and displays triangular marks above and below the changed entry item.

As described above, if any operation is not performed on the manipulation elements 6 over a predetermined time (for example, five seconds) after the entry items displayed in the entry field 42 are changed in accordance with a user's operation of the manipulation elements 6, the image search unit 33 searches for images corresponding to the entry items displayed in the entry field 42, which is the time and date information designated by the user.

Here, the image search unit 33 searches for images corresponding to the time and date information designated by the user, by comparing the time and date information designated by the user with the imaging times in the metadata associated with the respective images of the plurality of images stored in the storage unit 14.

In Specific Example 1, the image search unit 33 searches for images captured at "15:40, Jul. 1, 2021", which is the time and date information designated by the user, for example, and retrieves the still images 6 and 7, the imaging times of which match the time and date information. In a case where a plurality of images is retrieved in this manner, the image search unit 33 determines that the image (still image 6) having the earliest imaging time among the retrieved images is the detection result.

As illustrated at the center of the lower portion in FIG. 5, the display control unit 32 then sets the single reproduction mode, and displays the image determined to be the detection result by the image search unit 33, which is the image finally retrieved by the image search unit 33 (still image 6), on the entire surface of the backside monitor 4.

At this point of time, the display control unit 32 continues to display the time and date entry image 41, and superimposes and displays the time and date entry image 41 on the front of the retrieved image. Note that, here, the time and date entry image 41 may be displayed at a predetermined degree of transparency, such as display in a semitransparent manner, for example, so that the retrieved image can be seen therethrough.

With this arrangement, the user can check the retrieved image, and, in a case where the retrieved image is different from the intended image, the user can immediately input time and date information to the time and date entry image 41.

If an operation for making the time and date entry image 41 undisplayed is performed on the manipulation elements 6 after the retrieved image is displayed on the backside monitor 4, the display control unit 32 then makes the time and date entry image 41 undisplayed, as illustrated on the lower right side in FIG. 5.

Also, in the example illustrated in FIG. 6, the image search unit 33 searches for an image captured at "15:44, Jul. 1, 2021", which is the time and date information designated by the user. In a case where any image whose imaging time matches the time and date information designated by the user is not stored in the storage unit 14, the image search unit 33 then determines that the image whose imaging time is the closest to the time and date information designated by the user is the detection result (the image having the smallest difference between the time and date information and the imaging time, which is the still image 7).

As illustrated at the center of the lower portion in FIG. 6, the display control unit 32 then sets the single reproduction mode, and displays the image (still image 7) retrieved by the image search unit 33 on the entire surface of the backside monitor 4. At this point of time, the display control unit 32 continues to display the time and date entry image 41, and superimposes and displays the time and date entry image 41 on the front of the retrieved image.

If an operation for making the time and date entry image 41 undisplayed is performed on the manipulation elements 6 after the retrieved image is displayed on the backside monitor 4, the display control unit 32 then makes the time and date entry image 41 undisplayed, as illustrated on the lower right side in FIG. 6.

As described above, in Specific Example 1, the image search unit 33 searches for images corresponding to time and date information designated by the user via the time and date entry image 41, and the display control unit 32 displays a retrieved image on the backside monitor 4. Note that the images corresponding to the time and date information designated by the user include the image whose imaging time is the earliest among the images whose imaging times match the designated time and date information, and the image whose imaging time is the closest to the designated time and date information, and the same applies in the description below.

Specific Example 1 is particularly useful in a case where the time and date information based on which the user wishes to conduct a search is known. For example, it is useful when the user wishes to cause the backside monitor 4 to display a predetermined image from among the images captured so far, while taking a break during an event such as a wedding ceremony.

Figure 7:
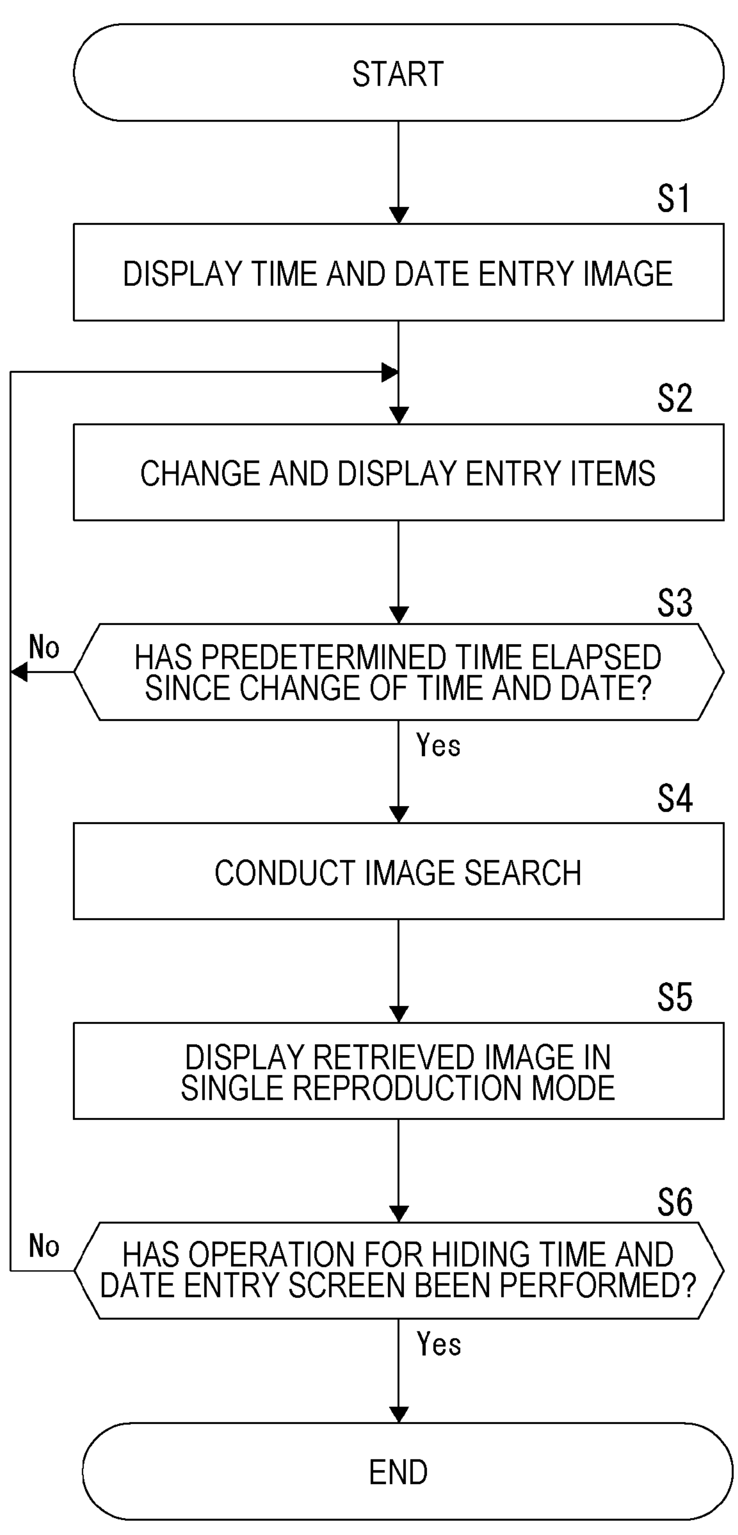
FIG. 7 is a flowchart illustrating the flow of the image search display process in Specific Example 1.

FIG. 7 is a flowchart illustrating the flow of the image search display process in Specific Example 1. When the image search display process in Specific Example 1 is started, in step S1, the display control unit 32 displays the time and date entry image 41 at the center of the backside monitor 4.

When the entry items (time and date information) in the entry field 42 are changed via the manipulation elements 6, the display control unit 32 then changes and displays the entry items in the entry field 42 in step S2. After that, in step S3, the image search unit 33 determines whether a predetermined time has elapsed since the latest change in the time and date information, and, if the predetermined time has not elapsed (No in step S3), the process returns to step S2.

If the predetermined time has elapsed since the time and date information was changed (step S3), on the other hand, the image search unit 33 searches for an image corresponding to the designated time and date information among the plurality of images stored in the storage unit 14 in step S4.

In step S5, the display control unit 32 then sets the single reproduction mode, and displays the image retrieved by the image search unit 33 on the entire surface of the backside monitor 4. At this point of time, the display control unit 32 continues to display the time and date entry image 41, and superimposes and displays the time and date entry image 41 on the front of the retrieved image.

Subsequently, in step S6, the display control unit 32 determines whether an operation for making the time and date entry image 41 undisplayed has been performed on the manipulation elements 6, and, if the operation for making the time and date entry image 41 undisplayed has not been performed (No in step S6), the process returns to step S2. If the operation for making the time and date entry image 41 undisplayed has been performed (Yes in step S6), the display control unit 32 makes the time and date entry image 41 undisplayed, and ends the image search display process.

3.2 Specific Example 2

Figure 8:
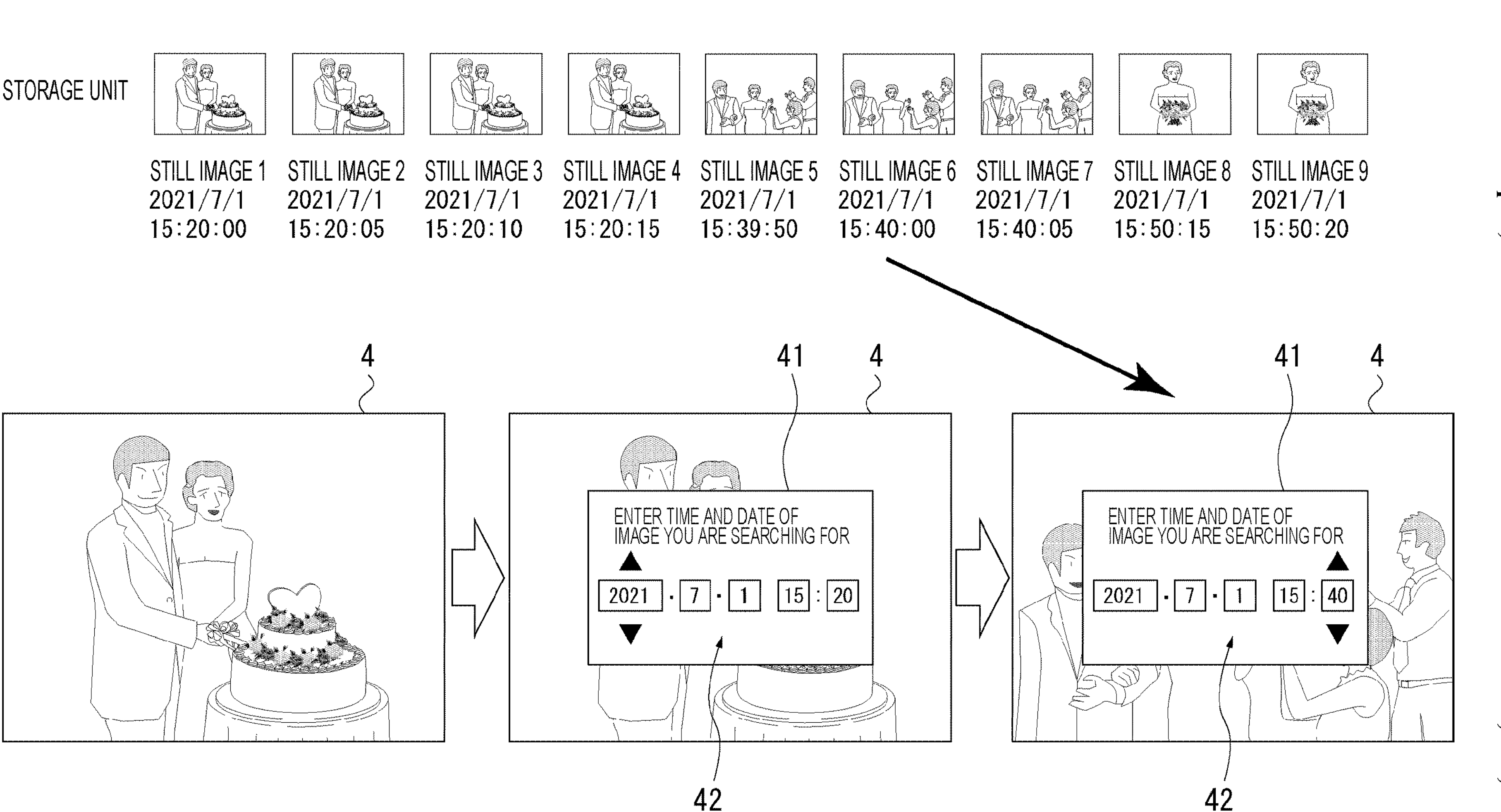
FIG. 8 is a diagram for explaining an image search display process in Specific Example 2.

FIG. 8 is a diagram for explaining an image search display process in Specific Example 2. In Specific Example 2, it is assumed that images similar to those in Specific Example 1 are stored in the storage unit 14, as illustrated also in the upper portion in FIG. 8.

In Specific Example 2, the single reproduction mode is set, and, as illustrated on the lower left side in FIG. 8, the display control unit 32 displays, on the backside monitor 4, one image (still image 1 in this case) among the plurality of images stored in the storage unit 14.

In a case where an operation for starting an image search display process is performed on the manipulation elements 6, the display control unit 32 then superimposes the time and date entry image 41 on the still image 1, and displays the superimposed image at the center of the backside monitor 4, as illustrated at the center of the lower portion in FIG. 8.

At this point of time, the display control unit 32 displays the time and date entry image 41 in a state in which the imaging time of the still image 1 is entered in the entry field 42, on the basis of the metadata of the still image 1 displayed on the backside monitor 4.

If any operation is not performed on the manipulation elements 6 over a predetermined time (for example, five seconds) after the entry items in the entry field 42 are changed in accordance with the user's operation of the manipulation elements 6, the image search unit 33 then searches for an image corresponding to the entry items displayed in the entry field 42, which is the time and date information designated by the user. Note that the search method is similar to that in Specific Example 1.

As illustrated on the lower right side in FIG. 8, the display control unit 32 then switches to the image (still image 6) retrieved by the image search unit 33, and displays the image on the entire surface of the backside monitor 4 in the single reproduction mode. At this point of time, the display control unit 32 continues to display the time and date entry image 41.

If an operation for making the time and date entry image 41 undisplayed is performed on the manipulation elements 6 after the retrieved image is displayed on the backside monitor 4, the display control unit 32 then makes the time and date entry image 41 undisplayed.

Figure 9:
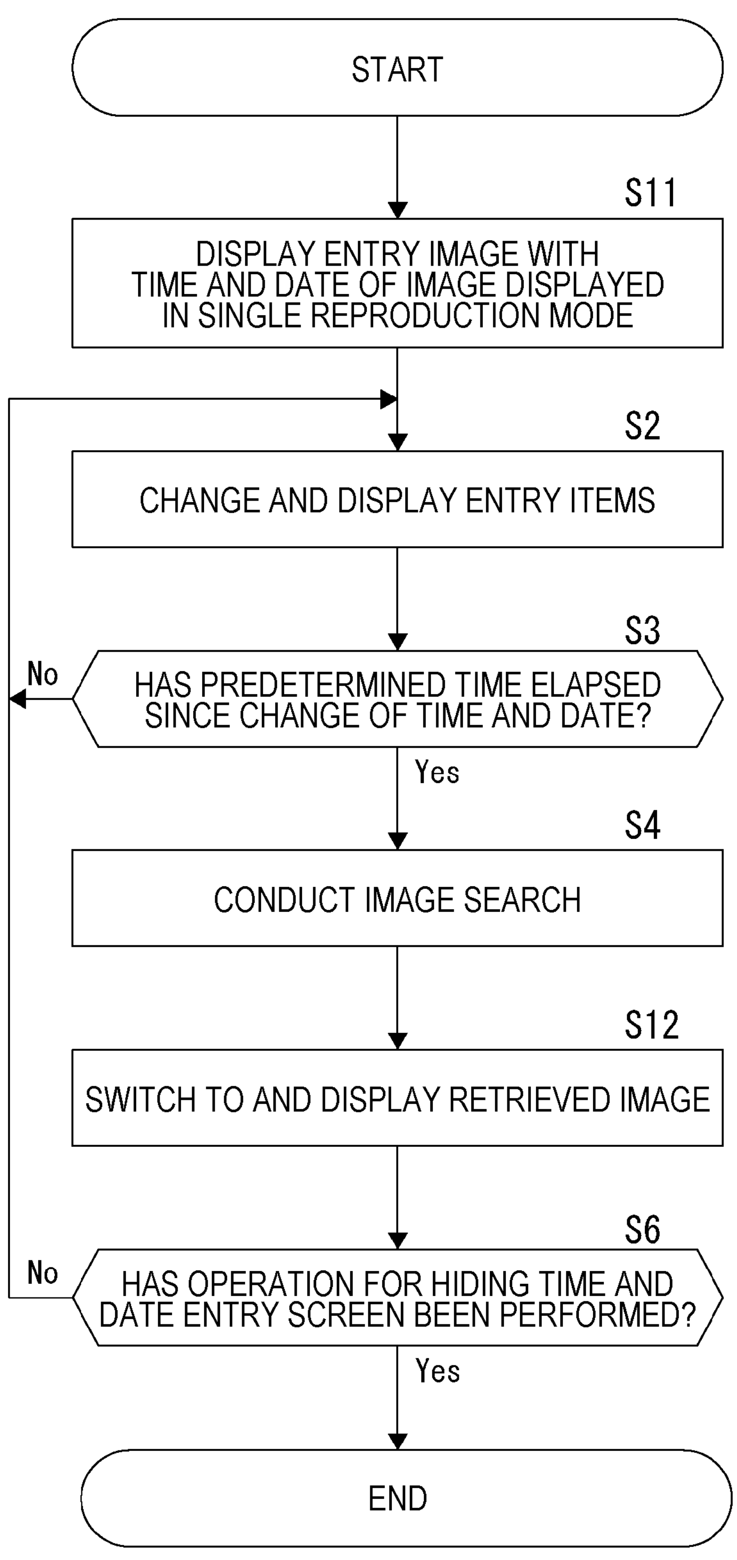
FIG. 9 is a flowchart illustrating the flow of the image search display process in Specific Example 2.

FIG. 9 is a flowchart illustrating the flow of the image search display process in Specific Example 2. Note that the same processes as those in Specific Example 1 are denoted by the same reference numerals as those used in Specific Example 1, and explanation of them is not made herein.

When the image search display process in Specific Example 2 is started, in step S11, the display control unit 32 displays the time and date entry image 41 in a state in which the imaging time of the image displayed on the backside monitor 4 in the single reproduction mode is entered in the entry field 42.

After that, the processes in steps S2 to S4 are performed, and, in step S12, the display control unit 32 switches the image displayed on the backside monitor 4 to the image retrieved by the image search unit 33, and displays the retrieved image. At this point of time, the display control unit 32 continues to display the time and date entry image 41, and superimposes and displays the time and date entry image 41 on the front of the retrieved image. After that, the process in step S6 is performed.

Specific Example 2 is particularly useful in a case where it is known how many minutes have elapsed since the image displayed on the backside monitor 4 till the scene of the image the user wishes to view. For example, Specific Example 2 is useful when intervals between scoring scenes in sports are known, or the time schedule in a predetermined event is known.

3.3 Specific Example 3

Figure 10:
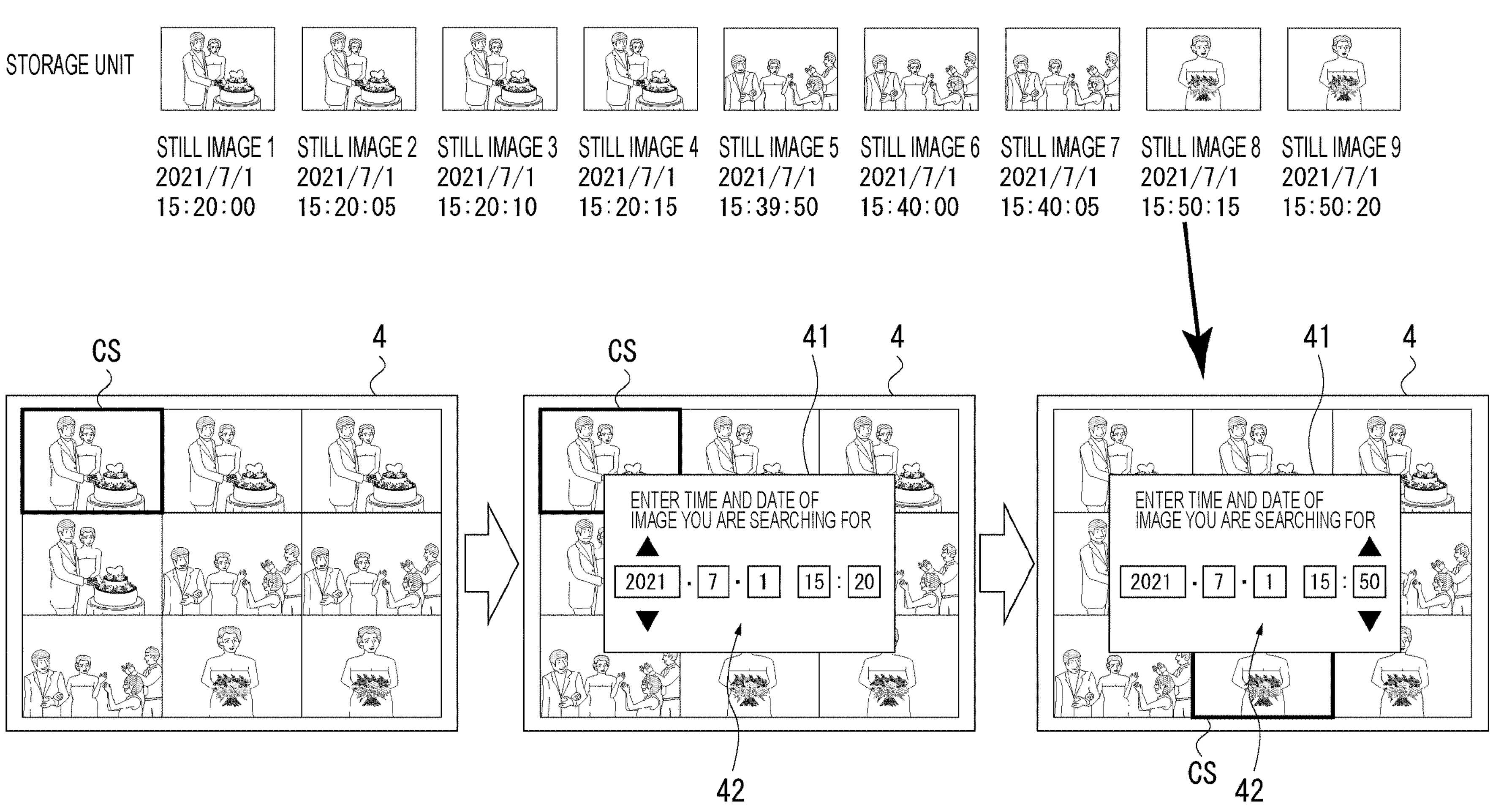
FIG. 10 is a diagram for explaining an image search display process in Specific Example 3.

FIG. 10 is a diagram for explaining an image search display process in Specific Example 3. In Specific Example 3, it is assumed that images similar to those in Specific Example 1 are stored in the storage unit 14, as illustrated also in the upper portion in FIG. 10.

In Specific Example 3, the list reproduction mode is set, and, as illustrated on the lower left side in FIG. 10, the display control unit 32 displays, on the backside monitor 4, a list of nine images that are stored in the storage unit 14. The display control unit 32 also places the cursor CS on the still image 1, for example.

In a case where an operation for starting an image search display process is performed on the manipulation elements 6, the display control unit 32 then superimposes the time and date entry image 41 for designating time and date information on the still image 1, and displays the superimposed image at the center of the backside monitor 4, as illustrated at the center of the lower portion in FIG. 10.

At this point of time, the display control unit 32 displays the time and date entry image 41 in a state in which the imaging time of the still image 1 is entered in the entry field 42, on the basis of the metadata of the still image 1 on which the cursor CS is placed among the plurality of images displayed on the backside monitor 4.

If any operation is not performed on the manipulation elements 6 over a predetermined time (for example, five seconds) after the entry items displayed in the entry field 42 are changed in accordance with a user's operation of the manipulation elements 6, the image search unit 33 then searches for an image corresponding to the entry items displayed in the entry field 42, which is the time and date information designated by the user. Note that the search method is similar to that in Specific Example 1.

As illustrated on the lower right side in FIG. 10, the display control unit 32 then switches the cursor CS to the image retrieved by the image search unit 33 (still image 8 in this case). At this point of time, the display control unit 32 continues to display the time and date entry image 41.

If an operation for making the time and date entry image 41 undisplayed is performed on the manipulation elements 6 after the retrieved image is displayed on the backside monitor 4, the display control unit 32 then makes the time and date entry image 41 undisplayed.

Figure 11:
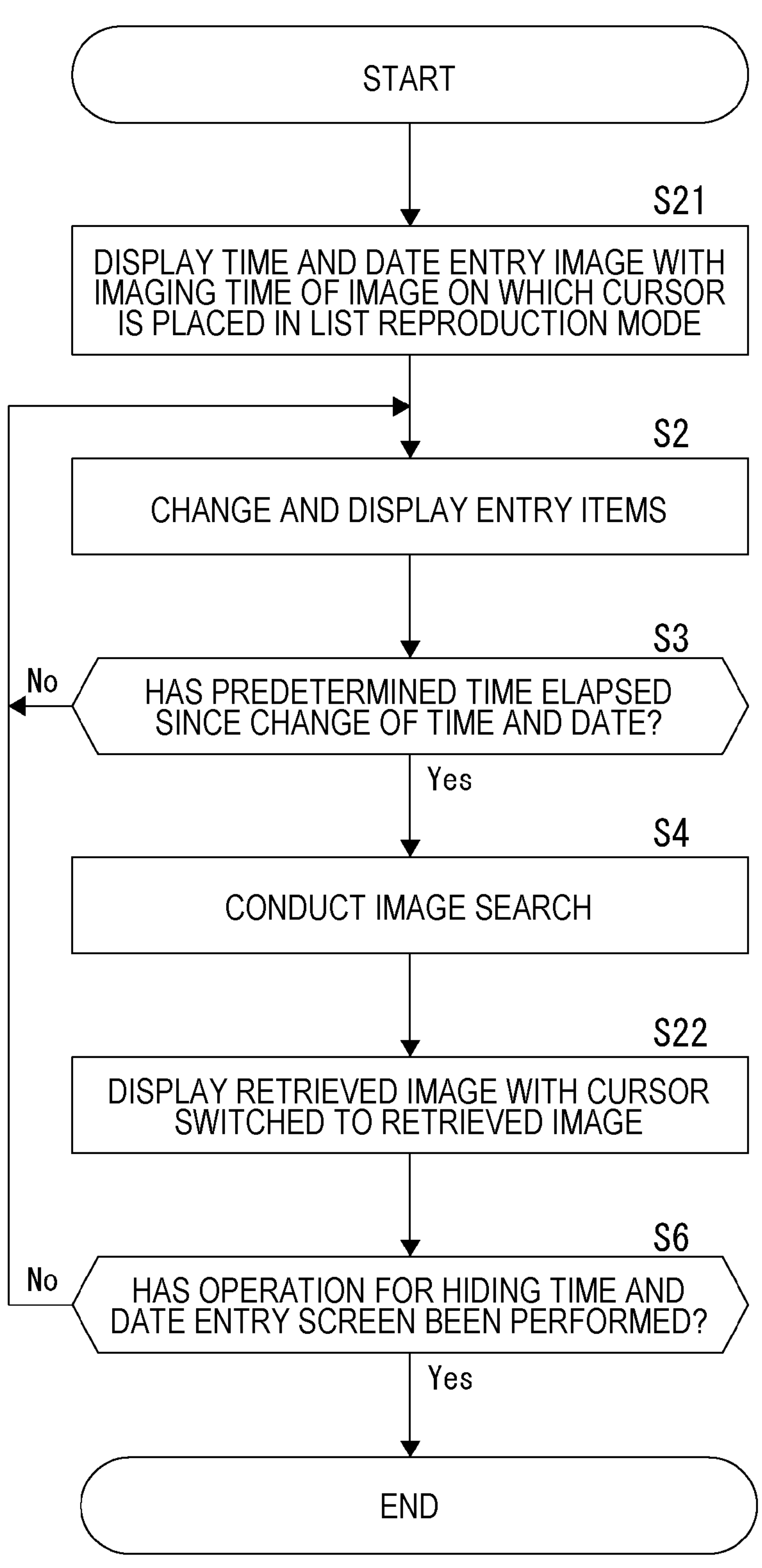
FIG. 11 is a flowchart illustrating the flow of the image search display process in Specific Example 3.

FIG. 11 is a flowchart illustrating the flow of the image search display process in Specific Example 3. Note that the same processes as those in Specific Example 1 are denoted by the same reference numerals as those used in Specific Example 1, and explanation of them is not made herein.

When the image search display process in Specific Example 2 is started, in step S21, the display control unit 32 displays the time and date entry image 41, with the imaging time of the image on which the cursor CS is placed among the plurality of images displayed on the backside monitor 4 in the list reproduction mode being entered in the entry field 42.

After that, the processes in steps S2 to S4 are performed, and, in step S22, the display control unit 32 displays the image retrieved by the image search unit 33, with the cursor CS being placed on the image. At this point of time, the display control unit 32 continues to display the time and date entry image 41, and superimposes and displays the time and date entry image 41 on the front of the retrieved image. After that, the process in step S6 is performed.

Like Specific Example 2, Specific Example 3 is particularly useful in a case where it is known how many minutes have elapsed since the image displayed on the backside monitor 4 till the scene of the image the user wishes to view.

Note that, in Specific Example 3, in step S22 described above, the image onto which the cursor CS is placed may be moved to the upper left on the backside monitor 4 and be displayed.

3.4 Specific Example 4

Figure 12:
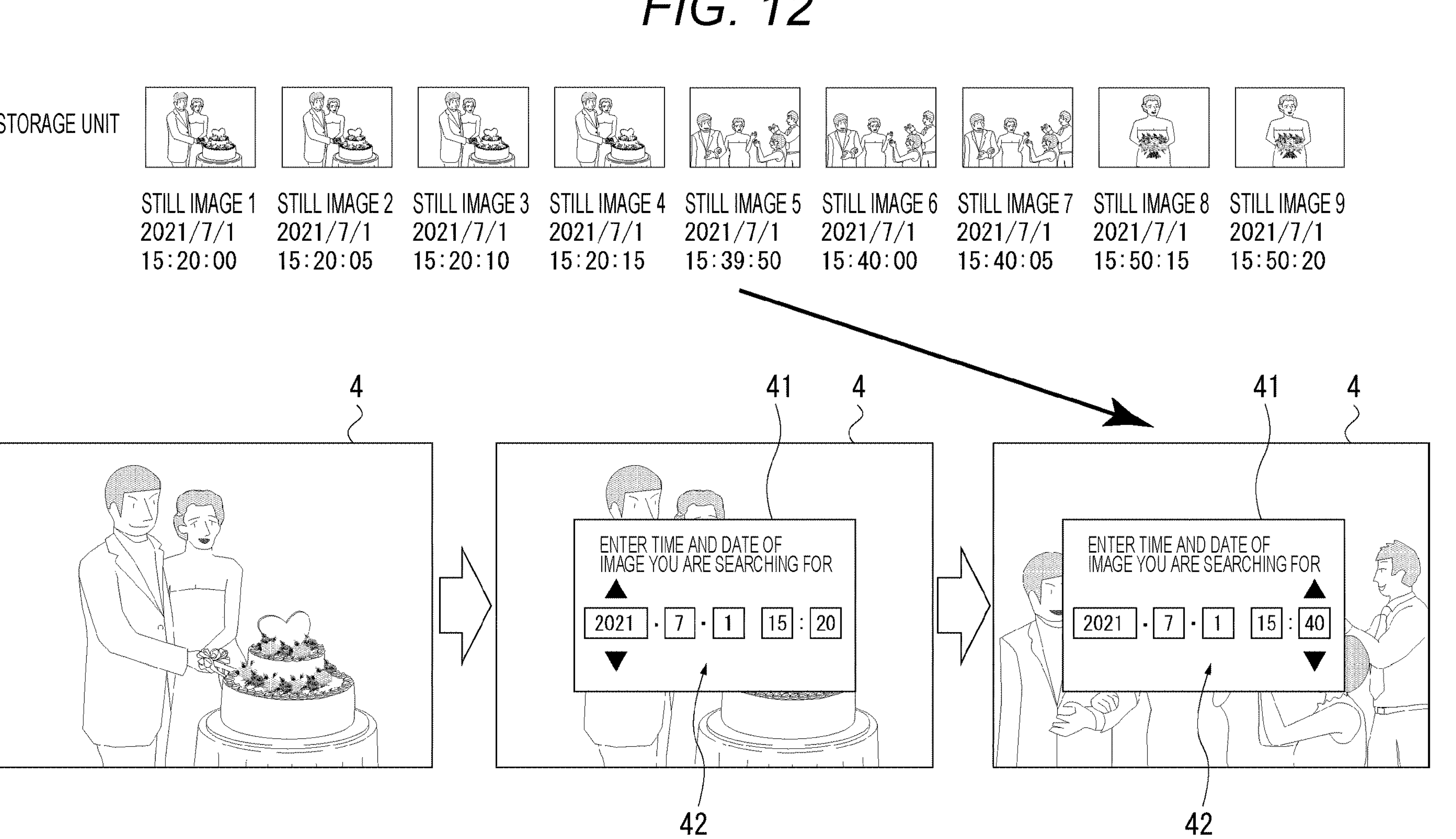
FIG. 12 is a diagram for explaining an image search display process in Specific Example 4.

FIG. 12 is a diagram for explaining an image search display process in Specific Example 4. In Specific Example 4, it is assumed that images similar to those in Specific Example 2 are stored in the storage unit 14, as illustrated also in the upper portion in FIG. 12. Also, in Specific Example 4, it is assumed that the still images 1 to 4 are grouped. It is also assumed that the still images 5 to 7 are grouped. It is further assumed that the still images 8 and 9 are grouped.

Here, grouping is to associate a plurality of images captured by one-time continuous imaging or interval imaging with one another. Note that group information for identifying the grouped images is associated with the image data of the grouped images, and is stored in the storage unit 14. That is, with the group information stored in the storage unit 14, it is possible to determine whether image data stored in the storage unit 14 belongs to a group.

Note that continuous imaging means that still images are continuously captured at predetermined intervals while the shutter button as a manipulation element 6 is pressed. Meanwhile, interval imaging means that still images are continuously captured at predetermined intervals that are set in advance.

In the description below, a process different from that of Specific Example 2, specifically, a process of conducting an image search is described in detail, and explanation of the same processes as those of Specific Example 2 is not made herein.

In Specific Example 4, the single reproduction mode is set, and, as illustrated in the lower left side in FIG. 12 and at the center in FIG. 12, the display control unit 32 superimposes the time and date entry image 41 for designating time and date information on the still image 1, and displays the superimposed image at the center on the backside monitor 4, as in Specific Example 2.

If any operation is not performed on the manipulation elements 6 over a predetermined time (for example, five seconds) after the entry items displayed in the entry field 42 are changed in accordance with a user's operation of the manipulation elements 6, the image search unit 33 then searches for the image (still image 6 in this case) corresponding to the entry items displayed in the entry field 42, which is the time and date information designated by the user.

At this point of time, in a case where the group information regarding the image corresponding to the time and date information designated by the user is stored, the image search unit 33 determines that one image in the group including the image is the search result.

For example, the image search unit 33 determines that the image (still image 5) having the earliest imaging time among the images (still images 5 to 7) in the group including the still image 6 is the search result.

As illustrated on the lower right side in FIG. 12, the display control unit 32 then switches to the image (still image 5 in this case) finally retrieved by the image search unit 33, and displays the image on the entire surface of the backside monitor 4. At this point of time, the display control unit 32 continues to display the time and date entry image 41.

If an operation for making the time and date entry image 41 undisplayed is performed on the manipulation elements 6 after the retrieved image is displayed on the backside monitor 4, the display control unit 32 then makes the time and date entry image 41 undisplayed.

Figure 13:
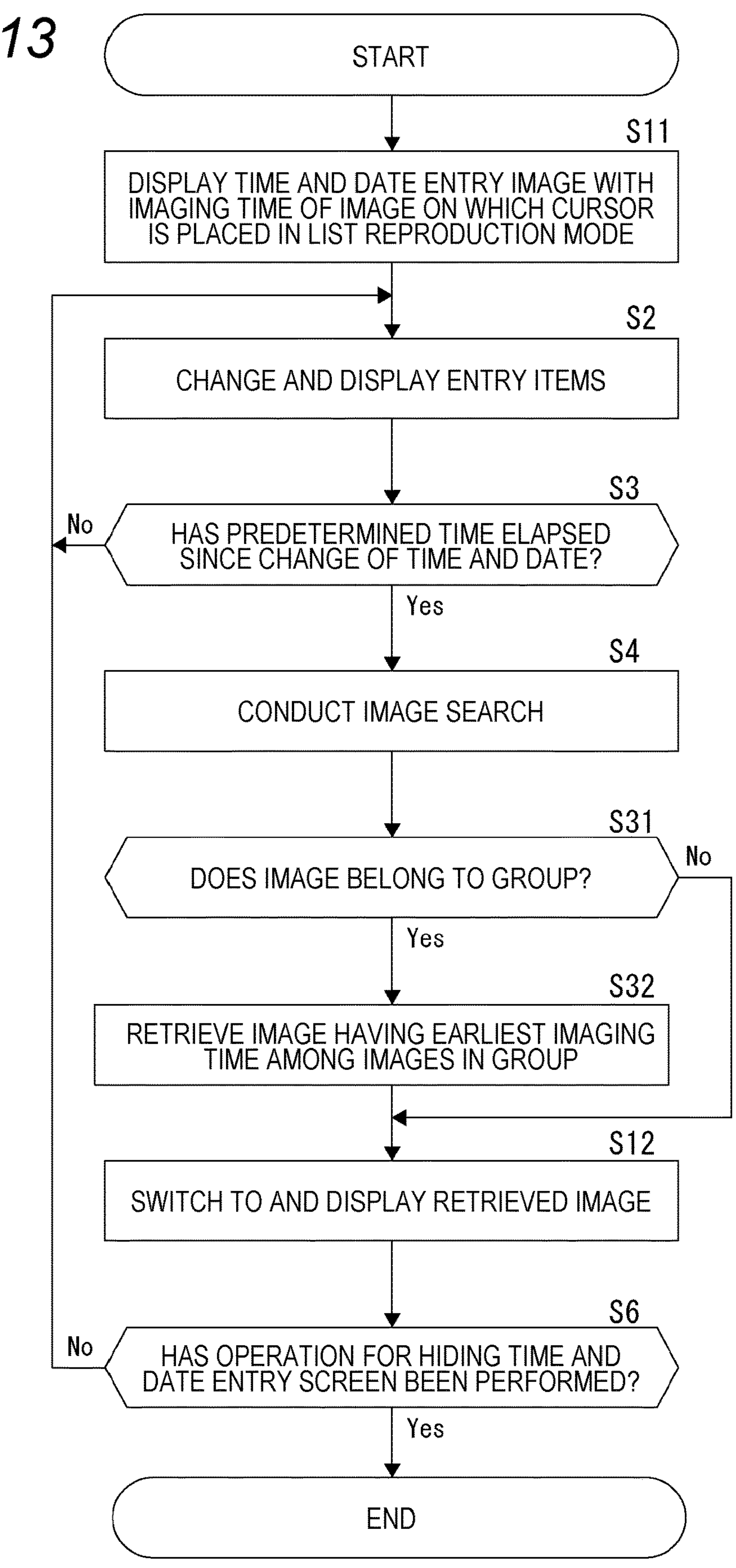
FIG. 13 is a flowchart illustrating the flow of the image search display process in Specific Example 4.

FIG. 13 is a flowchart illustrating the flow of the image search display process in Specific Example 4. Note that the same processes as those in Specific Example 2 are denoted by the same reference numerals as those used in Specific Example 2, and explanation of them is not made herein.

When the image search display process in Specific Example 4 is started, the processes in step S11 and steps S2 to S4 are performed, and, in step S31, the display control unit 32 determines whether the retrieved image is in a group, on the basis of the group information. As a result, if the image is not in any group (No in step S31), the process moves on to step S12. That is, in a case where the image is not in a group, the display control unit 32 in step S12 displays the image that has been searched for in step S4 and corresponds to the time and date information designated by the user (this image is the image whose imaging time is the earliest among the images whose imaging times match the designated time and date information, or the image whose imaging time is the closest to the designated time and date information). If the image is in a group (Yes in step S31), on the other hand, the image search unit 33 in step S32 determines that the image having the earliest imaging time in the group to which the image that has been searched for in step S4 and corresponds to the time and date information designated by the user belongs is the search result. After that, the processes in step S12 and step S6 are performed.

3.5 Specific Example 5

Figure 14:
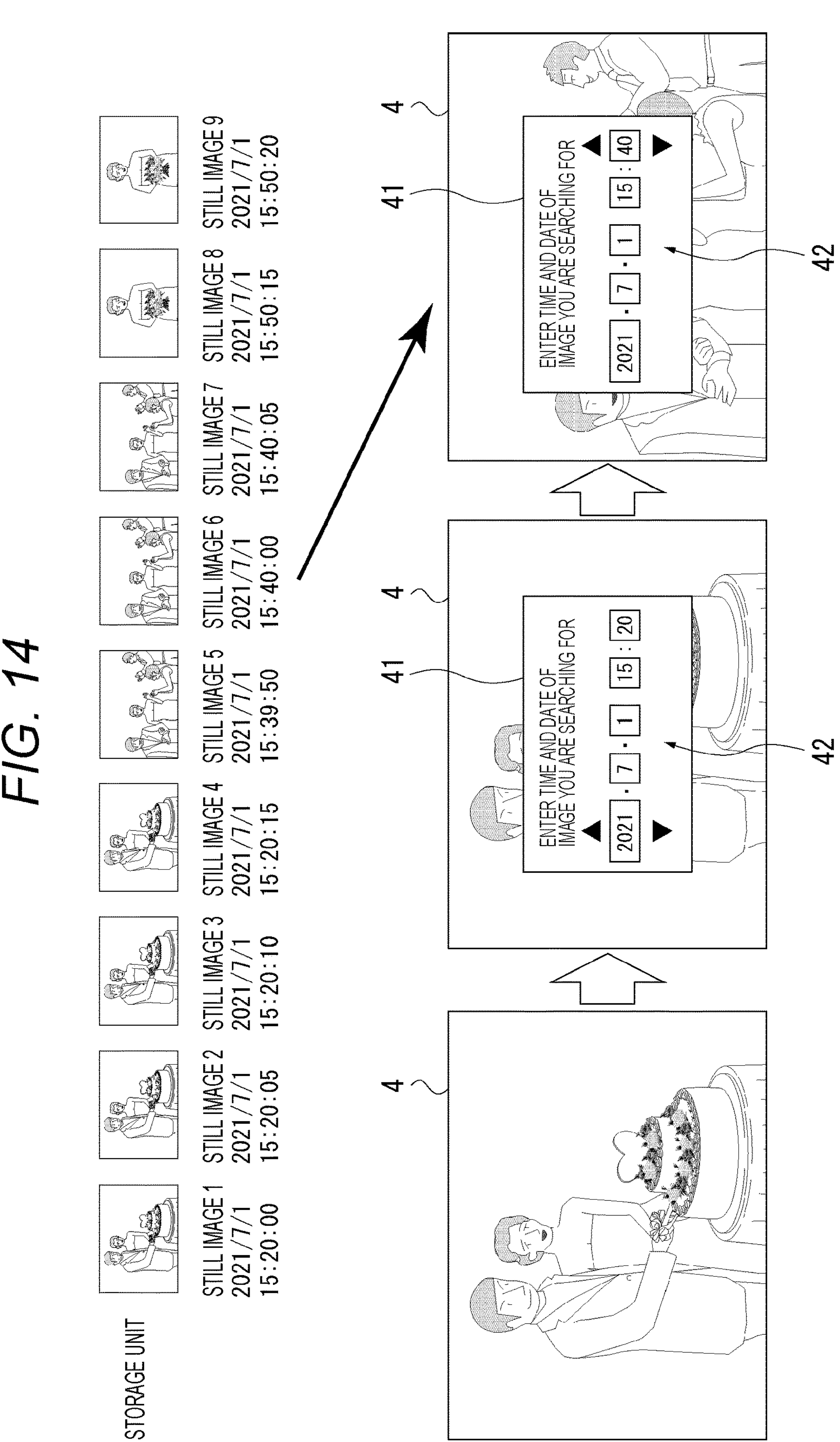
FIG. 14 is a diagram for explaining an image search display process in Specific Example 5.

FIG. 14 is a diagram for explaining an image search display process in Specific Example 5. In Specific Example 5, it is assumed that images and group information similar to those in Specific Example 4 are stored in the storage unit 14, as illustrated also in the upper portion in FIG. 14.

In Specific Example 5, in a case where the group information regarding the image corresponding to the time and date information designated by the user is stored, the image search unit 33 then determines that one image in the group including the image is the search result, as in Specific Example 4.

At this point of time in Specific Example 5, the image search unit 33 determines that the image (still image 6 in this case) having the imaging time closest to the designated time and date information among the images (still images 5 to 7) in the group including the still image 6 is the search result.

As illustrated on the lower right side in FIG. 14, the display control unit 32 then switches to the image (still image 6 in this case) retrieved by the image search unit 33, and displays the image on the entire surface of the backside monitor 4. At this point of time, the display control unit 32 continues to display the time and date entry image 41.

If an operation for making the time and date entry image 41 undisplayed is performed on the manipulation elements 6 after the retrieved image is displayed on the backside monitor 4, the display control unit 32 then makes the time and date entry image 41 undisplayed.

Figure 15:
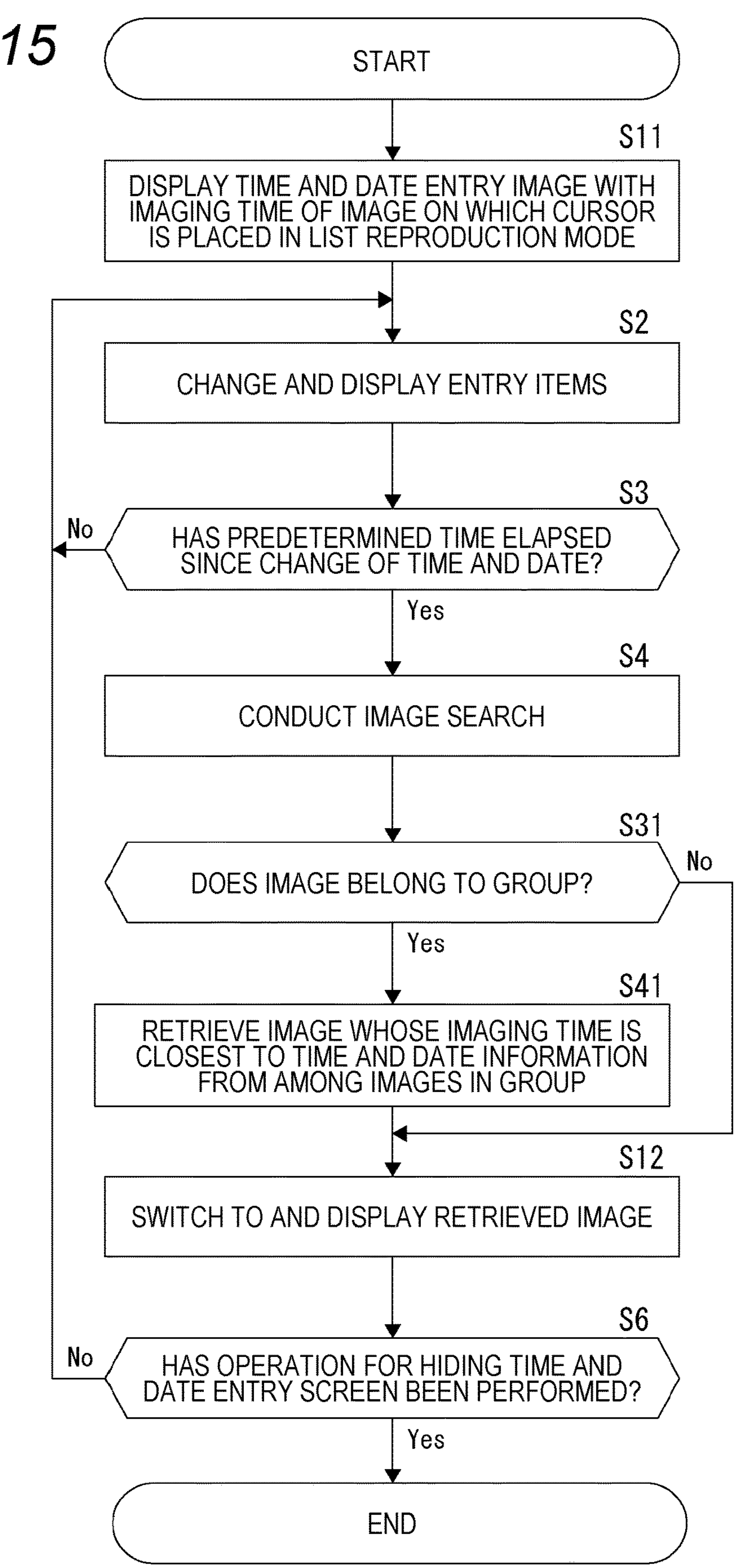
FIG. 15 is a flowchart illustrating the flow of the image search display process in Specific Example 5.

FIG. 15 is a flowchart illustrating the flow of the image search display process in Specific Example 5. Note that the same processes as those in Specific Example 4 are denoted by the same reference numerals as those used in Specific Example 4, and explanation of them is not made herein.

When the image search display process in Specific Example 5 is started, the processes in steps S11, steps S2 to S4, and step S31 are performed, and, if the retrieved image is in a group (Yes in step S31), the image search unit 33 in step S41 determines that the image whose imaging time is the closest to the designated time and date information in the group is the search result. After that, the processes in step S12 and step S6 are performed.

Note that the image search unit 33 may search for the image corresponding to the designated time and date information, and determine that the image having the earliest imaging time and the image having the imaging time closest to the time and date information in the group including the retrieved image is the search result.

In this case, the display control unit 32 can display the image having the earliest imaging time as the main image on the front surface of the backside monitor 4, and display the image whose imaging time is the closest to the time and date information as a sub image at an end of the backside monitor 4, for example.

3.6 Specific Example 6

In Specific Example 4 and Specific Example 5, an image corresponding to designated time and date information is searched for, and, in a case where group information regarding the retrieved image is stored, the image having the earliest imaging time or the image having the imaging time closest to the time and date information is determined to be the search result among the images in the group including the retrieved image.

In Specific Example 6, the image search unit 33 searches for the image corresponding to designated time and date information, and, in a case where there are images having the same imaging condition as that of the retrieved image, the image having the earliest imaging time or the image having the imaging time closest to the time and date information is determined to be the search result among the images having the same imaging condition as that of the retrieved image. Note that the other processes are similar to those in Specific Example 4 and Specific Example 5.

Here, the same imaging condition refers to at least one imaging-related condition among the shutter speed, the F value, the ISO sensitivity, the zoom magnification, and the like in the metadata associated with the image. There is a high possibility that images continuously captured under the same imaging condition in such a manner include a shared object or have been captured in a shared scene. Accordingly, the image search unit 33 searches for the image corresponding to designated time and date information, and, in a case where there are other images having the same ISO sensitivity as that of the retrieved image among the continuously captured images, for example, the image having the earliest imaging time or the image having the imaging time closest to the time and date information is determined to be the search result among the images having the same ISO sensitivity as that of the retrieved image. Note that the term "same" as used herein includes not only a case where the values completely coincide with each other, but also a case where the values fall within the same range.

3.7 Specific Example 7

Figure 16:
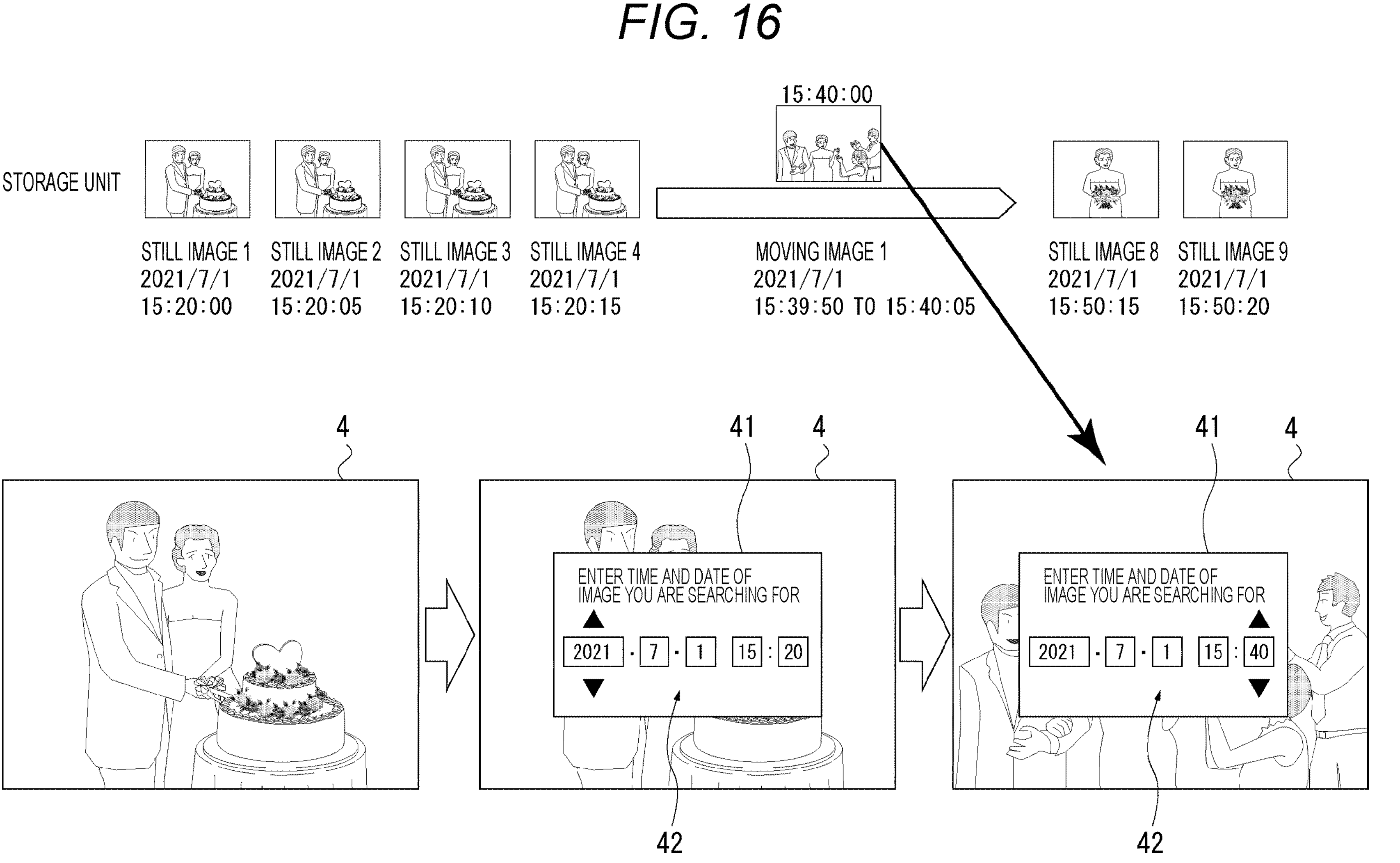
FIG. 16 is a diagram for explaining an image search display process in Specific Example 7.

FIG. 16 is a diagram for explaining an image search display process in Specific Example 7. In Specific Examples 1 to 6, cases where still images are stored as images in the storage unit 14 have been described. In Specific Example 7, a case where still images and a moving image are stored in the storage unit 14 is described.

In Specific Example 7, as illustrated in the upper portion in FIG. 16, it is assumed that six still images 1 to 4, 8, and 9, and one moving image 1 are stored in the storage unit 14. Note that the still images 1 to 4 and the still images 8 and 9 are similar to those in Specific Examples 1 to 6. It is assumed that the moving image 1 was captured from 15:39:50 till 15:40:05 on Jul. 1, 2021.

In a case where an operation for starting an image search display process is performed on the manipulation elements 6 as in Specific Example 2, the display control unit 32 then superimposes the time and date entry image 41 for designating time and date information on the still image 1, and displays the superimposed image at the center of the backside monitor 4, as illustrated at the center of the lower portion in FIG. 16.

If any operation is not performed on the manipulation elements 6 over a predetermined time (for example, five seconds) after the entry items displayed in the entry field 42 are changed in accordance with a user's operation of the manipulation elements 6, the image search unit 33 then searches for an image corresponding to the entry items displayed in the entry field 42, which is the time and date information designated by the user.

At this point of time, in a case where the image corresponding to the time and date information designated by the user is a moving image, the image search unit 33 searches for a frame matching the time and date information designated by the user among a plurality of frames constituting the moving image.

Specifically, the image search unit 33 reads the imaging time and the frame rate from the metafile associated with the moving image. The image search unit 33 then subtracts the imaging time from the designated time and date information, and determines which frame counted from the start of imaging is the frame at the time matching the time and date information designated by the user, on the basis of the subtraction result and the frame rate. The image search unit 33 then determines that the frame corresponding to the determined frame number is the search result.

Note that whether or not the image corresponding to the time and date information designated by the user is a moving image can be determined from whether the time and date information is later than the imaging time (imaging start time) of the moving image, and is earlier than the time obtained by adding the imaging duration to the imaging time of the moving image.

As illustrated on the lower right side in FIG. 16, the display control unit 32 then switches to the image (frame) retrieved by the image search unit 33, and displays the image on the entire surface of the backside monitor 4. At this point of time, the display control unit 32 continues to display the time and date entry image 41.

If an operation for making the time and date entry image 41 undisplayed is performed on the manipulation elements 6 after the retrieved image is displayed on the backside monitor 4, the display control unit 32 then makes the time and date entry image 41 undisplayed.

Figure 17:
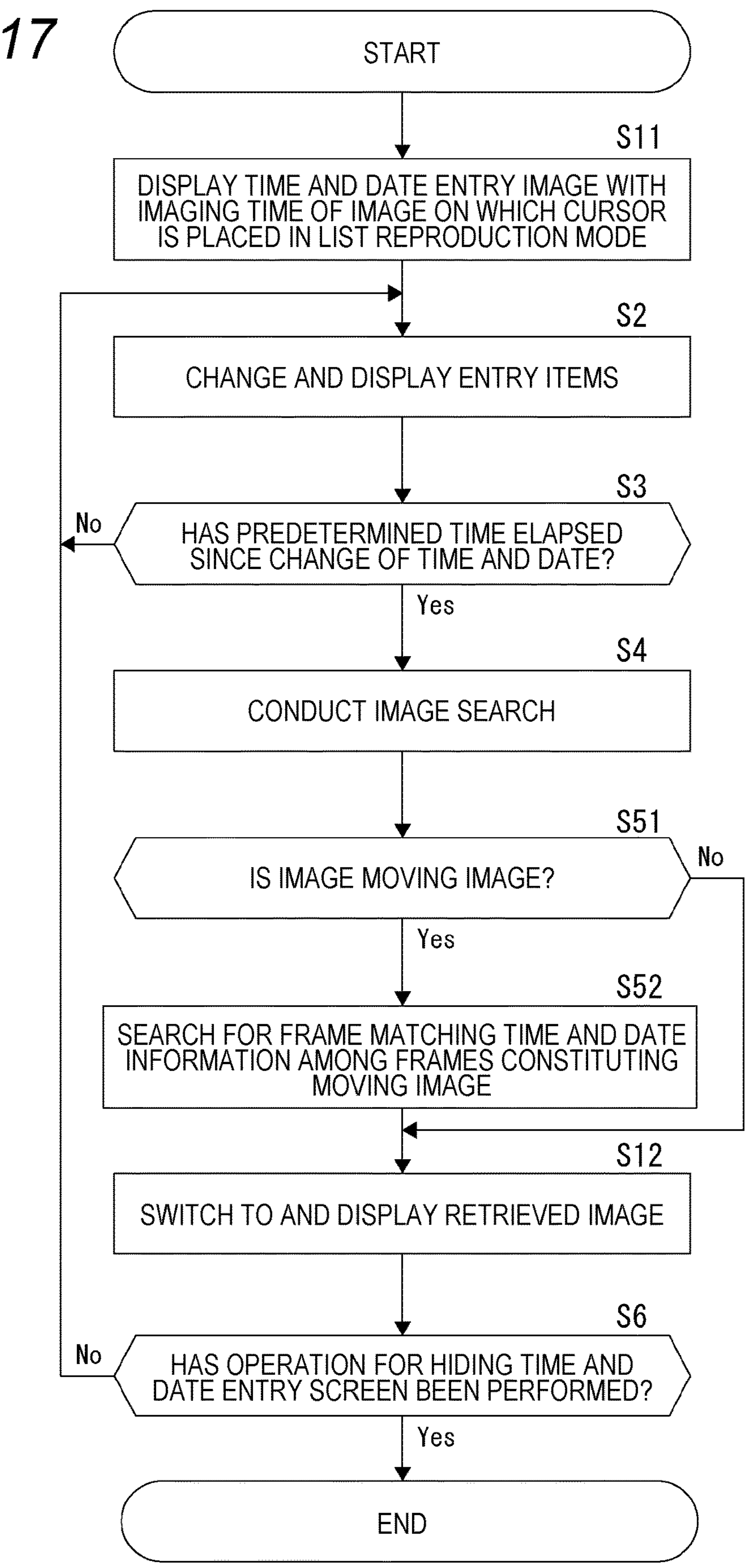
FIG. 17 is a flowchart illustrating the flow of the image search display process in Specific Example 7.

FIG. 17 is a flowchart illustrating the flow of the image search display process in Specific Example 7. Note that the same processes as those in Specific Example 2 are denoted by the same reference numerals as those used in Specific Example 2, and explanation of them is not made herein.

When the image search display process in Specific Example 7 is started, the processes in step S11 and steps S2 to S4 are performed, and, in step S51, the image search unit 33 determines whether the image corresponding to the time and date information designated by the user is a moving image. As a result, if the image is not a moving image (No in step S51), the process moves on to step S12. If the image is a moving image (Yes in step S51), on the other hand, the image search unit 33 in step S52 determines that the frame matching the designated time and date information among the plurality of frames constituting the retrieved moving image is the detection result. After that, the processes in step S12 and step S6 are performed.

Note that, in a case where the image corresponding to the time and date information designated by the user is a moving image, the frame matching the time and date information designated by the user among the plurality of frames constituting the moving image is determined to be the search result. However, the first frame among the plurality of frames constituting the moving image may be determined to be the detection result.

3.8 Specific Example 8

FIG. 18 is a diagram for explaining an image search display process in Specific Example 8. In Specific Examples 1 to 6, cases where still images are stored as images in the storage unit 14 have been described. In Specific Example 8, a case where a dual recording function capable of capturing a still image, for example, when a shutter button is pressed during imaging of a moving image is provided is described. Therefore, in Specific Example 8, still images and a moving image are stored in the storage unit 14.

In Specific Example 8, as illustrated in the upper portion in FIG. 18, it is assumed that six still images 1 to 4, 8, and 9, and one moving image 1 are stored in the storage unit 14, as in Specific Example 7. Also, it is assumed that still image 5 to 7 are captured and stored into the storage unit 14 while the moving image 1 is being captured.

In a case where an operation for starting an image search display process is performed on the manipulation elements 6 as in Specific Example 2, the display control unit 32 then superimposes the time and date entry image 41 for designating time and date information on the still image 1, for example, and displays the superimposed image at the center of the backside monitor 4, as illustrated at the center of the lower portion in FIG. 18.

If any operation is not performed on the manipulation elements 6 over a predetermined time (for example, five seconds) after the entry items displayed in the entry field 42 are changed in accordance with a user's operation of the manipulation elements 6, the image search unit 33 then searches for an image corresponding to the entry items displayed in the entry field 42, which is the time and date information designated by the user.

At this point of time, in a case where a moving image is stored in the storage unit 14, the image search unit 33 searches for the image (a still image or a moving image) corresponding to the time and date information designated by the user, the imaging time (imaging start time) for the moving image and the imaging time for the still image being the comparison targets.

Specifically, for the moving image 1, "15:39:50, Jul. 1, 2021", which is the imaging time, is the comparison target. Accordingly, the still image 6 having the imaging time closest to the designated time and date information herein is retrieved as the image corresponding to the time and date information designated by the user. Note that the other processes are similar to those of Specific Examples 1 to 6, and therefore, explanation of them is not made herein.

3.9 Specific Example 9

Figure 19:
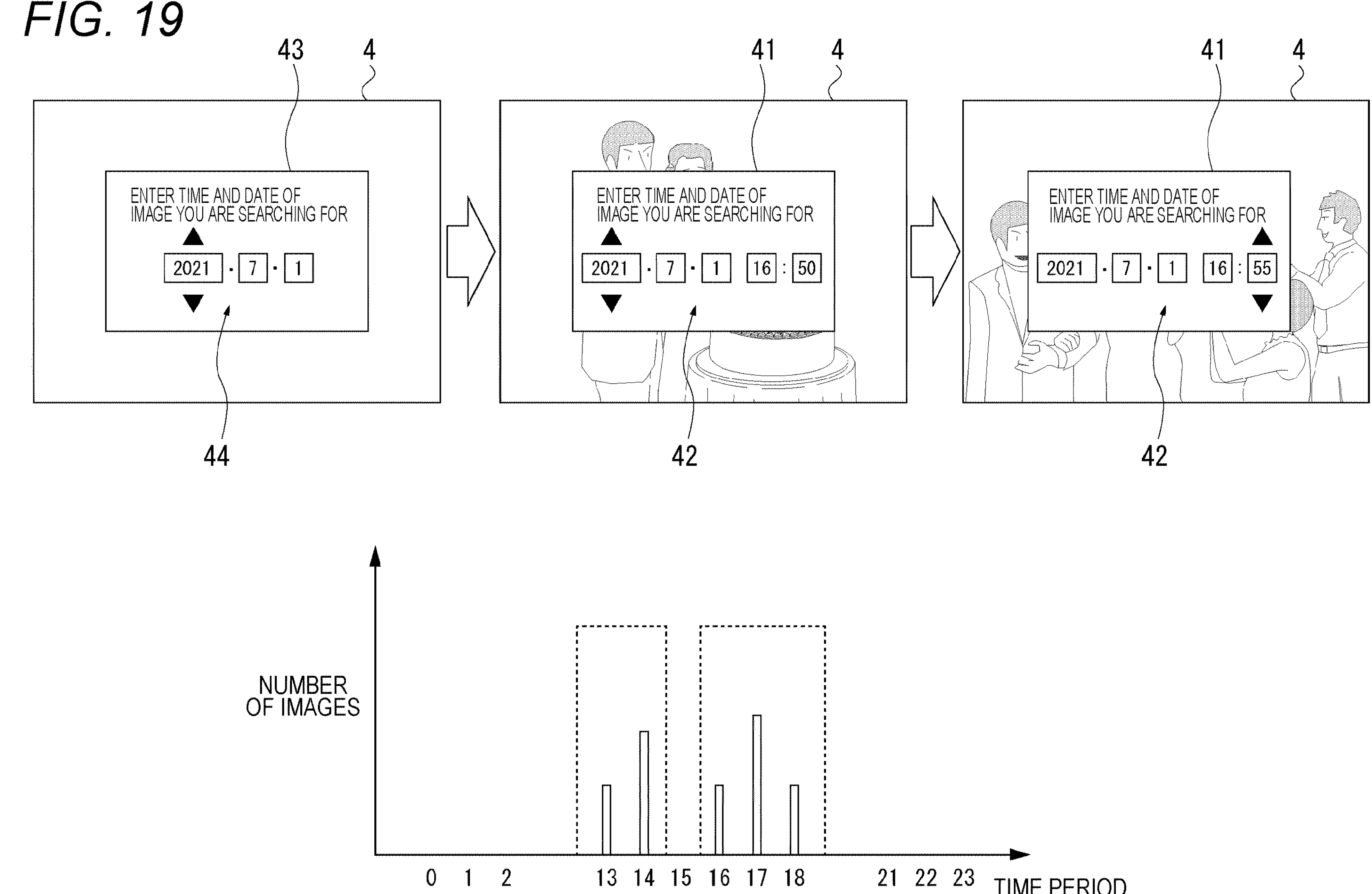
FIG. 19 is a diagram for explaining an image search display process in Specific Example 9.

FIG. 19 is a diagram for explaining an image search display process in Specific Example 9. In Specific Example 9, it is assumed that a plurality of images (still images) captured at different times on the same date are stored in the storage unit 14, as illustrated in the lower portion in FIG. 19.

In a case where an operation for starting an image search display process is performed on the manipulation elements 6, the display control unit 32 then superimposes a time and date entry image 43 for designating time and date information on the still image 1, and displays the superimposed image at the center of the backside monitor 4, as illustrated on the upper left side in FIG. 19.

Here, the time and date entry image 43 includes an entry field 44 in which only "year", "month", and "day" are entry items, but "hour" and "minute" are not entry items.

If any operation is not performed on the manipulation elements 6 over a predetermined time (for example, five seconds) after the entry items displayed in the entry field 44 are changed in accordance with a user's operation of the manipulation elements 6, the image search unit 33 then searches for an image corresponding to the entry items displayed in the entry field 44, which is the time and date information (only the date here) designated by the user. Since the search is performed only with the date, a rough search of a lower accuracy is performed, compared with Specific Examples 1 to 8.

The image search unit 33 then searches for an image that corresponds to the time and date information designated by the user or has the date input by the user, on the basis of the imaging time in the metadata. Here, in a case where there is a plurality of images corresponding to the date input by the user, the image having the earliest imaging time in the group of images captured in the most concentrative manner among the images captured on the date is determined to be the search result.

Note that, as illustrated in the lower portion in FIG. 19, the image search unit 33 counts the number of images per unit time (per hour) herein, the images corresponding to the date input by the user. The image search unit 33 then obtains image groups, the time period (for example, 15:00) in which the counted number of images is zero being the separator. In the example illustrated in the lower portion in FIG. 19, two image groups surrounded by dashed lines can be obtained.

The image search unit 33 also counts the number of images in each image group, and retrieves the image group having the largest number of images as the image group captured in the most concentrative manner. For example, the image group captured between 16:00 and 19:00 is retrieve as the image group captured in the most concentrative manner.

After that, as illustrated at the center of the upper portion in FIG. 19, the display control unit 32 superimposes the time and date entry image 41 on the image finally retrieved by the image search unit 33, and displays these images on the backside monitor 4. Here, the display is switched from the time and date entry image 43 described above to the time and date entry image 41, and the imaging time of the image displayed on the backside monitor 4 is entered in the entry field 42 of the time and date entry image 41.

After that, if any operation is not performed on the manipulation elements 6 over a predetermined time (for example, five seconds) after the entry items displayed in the entry field 42 are changed in accordance with a user's operation of the manipulation elements 6, the image search unit 33 searches for the image corresponding to the entry items displayed in the entry field 42, which is the time and date information (including the hour and the minute) designated by the user. Here, the image search is performed more accurately (finely) than in a case where the search is performed only in accordance with the date.

As illustrated on the upper right side in FIG. 19, the display control unit 32 then switches to the image retrieved by the image search unit 33, and displays the image on the entire surface of the backside monitor 4. At this point of time, the display control unit 32 continues to display the time and date entry image 41.

If an operation for making the time and date entry image 41 undisplayed is performed on the manipulation elements 6 after the retrieved image is displayed on the backside monitor 4, the display control unit 32 then makes the time and date entry image 41 undisplayed.

FIG. 20 is a flowchart illustrating the flow of the image search display process in Specific Example 9. Note that the same processes as those in Specific Example 1 are denoted by the same reference numerals as those used in Specific Example 1, and explanation of them is not made herein.

When the image search display process in Specific Example 9 is started, in step S61, the display control unit 32 displays the time and date entry image 43 including the entry field 44.

When the entry items (date) in the entry field 44 are changed via the manipulation elements 6, the display control unit 32 then changes and displays the entry items in the entry field 44 in step S62. After that, in step S63, the image search unit 33 determines whether a predetermined time has elapsed since the latest change in the time and date information (date), and, if the predetermined time has not elapsed (No in step S63), the process returns to step S62.

If the predetermined time has elapsed since the time and date information was changed (step S63), on the other hand, the image search unit 33 searches for an image corresponding to the designated time and date information (date) among the plurality of images stored in the storage unit 14 in step 564. Further, in a case where there is a plurality of images corresponding to the designated time and date information, the image search unit 33 counts the number of images per unit time.

In step 565, the image search unit 33 also obtains image groups, the time period (for example, 15:00) in which the counted number of images is zero being the separator. In step S66, the image search unit 33 counts the number of images in each image group, and retrieves the image group having the largest number of images as the image group captured in the most concentrative manner. The image search unit 33 then determines that the image whose imaging time is the earliest in the image group captured in the most concentrative manner is the search result.

After that, in step S67, the display control unit 32 superimposes the time and date entry image 41 on the image finally retrieved by the image search unit 33, and displays these images on the backside monitor 4. After that, the processes in steps S2 to S6 are performed, as in Specific Example 1. Note that, in Specific Example 9, the image groups are obtained, with the time period in which the counted number of images is zero being the separator. However, image groups with hourly separators (hourly separated at 13:00, 14:00, 15:00, and the like) may be obtained. In a case where hourly separators are used, the number of images in the group of images between 17:00 and 18:00 is the largest in the example illustrated in the lower portion in FIG. 19, and therefore, in step S67 in FIG. 20, the image captured at the earliest imaging time in the group of images captured between 17:00 and 18:00 is displayed on the backside monitor 4.

3.10 Specific Example 10

Figure 21:
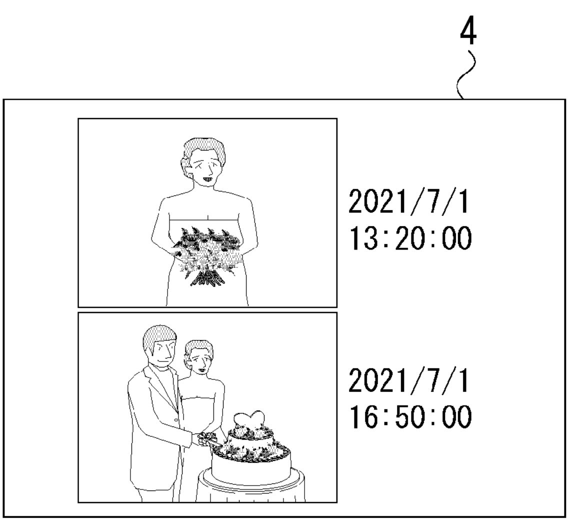
FIG. 21 is a diagram for explaining an image search display process in Specific Example 10.
Figure 22:
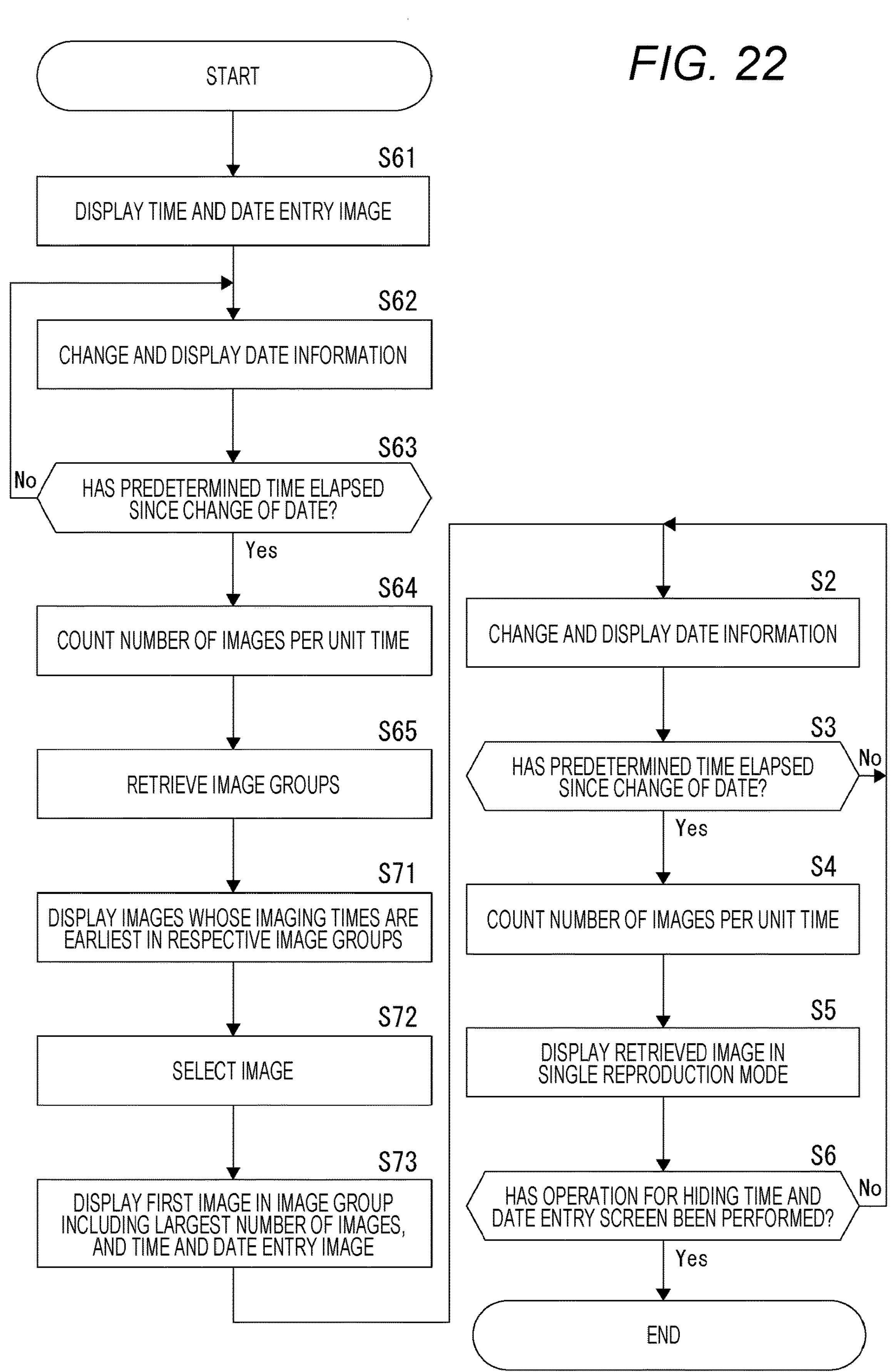
FIG. 22 is a flowchart illustrating the flow of the image search display process in Specific Example 10.

FIG. 21 is a diagram for explaining an image search display process in Specific Example 10. FIG. 22 is a flowchart illustrating the flow of the image search display process in Specific Example 10. Specific Example 10 differs from Specific Example 9 in that the processes in steps S71 to S73 are performed, instead of the process in steps S66 and S67.

In Specific Example 10, in step S65, the image search unit 33 also obtains image groups, the time period (for example, 15:00) in which the counted number of images is zero being the separator, as in Specific Example 9. After that, in step S71, the display control unit 32 displays a list of images captured at the earliest imaging time among the images in the image groups on the backside monitor 4, as illustrated in FIG. 21. For example, as illustrated in the lower portion in FIG. 19, in a case where a plurality of images (still images) captured at different times on the same date are stored in the storage unit 14, the image whose imaging time is the earliest in the group of images captured between 13:00 and 15:00, and the image whose imaging time is the earliest in the group of images captured between 16:00 and 19:00 are arranged in a vertically direction and are displayed on the backside monitor 4 in FIG. 21. Note that the arrangement of the images having the earliest imaging times in the respective image groups is not limited to the method of arranging the images vertically. Instead, the images may be arranged horizontally, or may be displayed as thumbnails in vertical and horizontal directions.

When one of the listed images is selected via the manipulation element 6 in step S72, the display control unit 32 then displays the selected image on the backside monitor 4, and superimposes and displays the time and date entry image 41 in a state in which the imaging time of the selected image is entered in the entry field 42 in step S73. After that, the processes in steps S2 to S6 are performed, as in Specific Example 1.

3.11 Specific Example 11

In Specific Example 11, a predetermined image analysis process is performed on the image that has been retrieved by the image search unit 33 and corresponds to time and date information designated by the user, and the scene in which the retrieved image has been captured is identified. Note that various known image analysis techniques can be adopted in the image analysis process, and detailed explanation of those techniques is not made herein.

When the image retrieved by the image search unit 33 is displayed, the display control unit 32 selects the single reproduction mode and the list display mode on the basis of the scene identified through the image analysis process, and then displays the image. For example, in a case where the scene is a sport scene, the list display mode is selected, because there is a high possibility that images have been continuously captured. Further, in a case where the scene is in a portrait mode, the single reproduction mode is set so as to show images slowly.

3.12 Specific Example 12

In Specific Example 12, the imaging device 1 is connected to an external device. Note that the external device is a smartphone, or a computer having a CPU, such as a personal computer. Further, in a case where the external device is a smartphone, a time and date entry image 45 as illustrated in FIG. 23 is displayed on a display unit of the external device. In the time and date entry image 45, "month, day", "hour", and "minute" are displayed so as to be scrolled up and down, and a swipe operation (touch operation) of the user is accepted.

Further, when the imaging device 1 receives time and date information that is input via the time and date entry image 45 in the external device, the imaging device 1 searches for an image as described in Specific Examples 1 to 10, and transmits the retrieved image to the external device. By doing so, the imaging device 1 can transmit the image corresponding to the time and date information designated by the user, to the external device.

3.13 Specific Example 13

In Specific Example 13, a plurality of imaging devices 1 is interconnected via a network. When time and date information is input via the time and date entry image 41 in one of the imaging devices 1, for example, the time and date information is then transmitted to the other imaging devices 1. All the imaging devices 1 then search for an image corresponding to the time and date information designated by the user, and transmit the retrieved image to the imaging device 1 to which the time and date information was input.

Thus, in a case where one event is imaged by a plurality of imaging devices 1, it is possible to check images captured by the other imaging devices 1.

4. Modifications

Note that embodiments are not limited to the examples described above, and may have configurations as various modifications.

For example, although the imaging device 1 has been described as an example of the information processing device, the information processing device may be any of various devices such as a computer, a game machine, and a television receiver.

Further, for example, in Specific Example 2, the time and date information is input to the time and date entry image 41. However, a difference time and date entry image for prompting the user to input a difference (for example, 15 minutes later or the like) from the imaging time of the image displayed on the backside monitor 4 may be displayed on the backside monitor 4, and the difference time and date entry image may also be displayed when an image retrieved by the image search unit 33 is displayed.

5. Summary

As described above, an information processing device (the imaging device 1) according to an embodiment includes: an image search unit 33 that searches for an image corresponding to designated time and date information among a plurality of images stored and associated with imaging times; and a display control unit 32 that displays, on the display unit 15 (backside monitor 4), an image based on a result of the search conducted by the image search unit 33.

As a result, the information processing device can compare the designated time and date information with the imaging time associated with the image, and determine that an image whose imaging time is close to the designated time and date information is a search result.

Thus, the information processing device can increase user-friendliness in an image search.

Also, in a case where there is a plurality of images associated with an imaging time that matches the designated time and date information, the image search unit 33 may determine that the image having the earliest imaging time among the plurality of associated images is the search result.

Thus, it is possible to display the image most suited to the time and date information designated by the user.

Further, in a case where there are no images associated with an imaging time that matches the designated time and date information, the image search unit 33 determines that the image having the imaging time closest to the designated time and date information is the search result.

Thus, even in a case where there are no images associated with the imaging time matching the time and date information designated by the user, it is possible to display an image having a high possibility of being the image desired by the user, by displaying the image closest to the time and date information.

Also, it is conceivable that the display control unit 32 displays, on the display unit 15, a time and date entry image for prompting the user to input time and date information, and also displays the time and date entry image when displaying an image retrieved by the image search unit 33.

Thus, it is possible to immediately input the time and date information when an image not desired by the user is displayed.

Further, it is conceivable that the display control unit 32 displays, on the display unit 15, a time and date entry image for prompting the user to input time and date information, and displays, in the time and date entry image, the imaging time associated with the image displayed on the display unit 15.

Thus, in a case where the user knows how many minutes passed since the image displayed on the display unit till the scene of the image to be displayed, it is possible to provide a user interface that facilitates the user to make an input to designate time and date information.

Also, it is conceivable that the display control unit 32 displays, on the display unit, a time and date entry image for prompting an input of a difference from the imaging time associated with the image displayed on the display unit 15, and also displays the difference time and date entry image when displaying an image retrieved by the image search unit.

Thus, in a case where the user knows how many minutes passed since the image displayed on the display unit till the scene of the image to be displayed, the user can easily input the difference.

It is conceivable that the plurality of images includes a still image and a moving image, and, in a case where the image corresponding to the designated time and date information is the moving image, the display control unit 32 displays the first frame in the moving image on the display unit 15.

Thus, the user can view the first frame in the moving image corresponding to the designated time and date information.

It is conceivable that the plurality of images includes a still image and a moving image, and, in a case where the image corresponding to the designated time and date information is the moving image, the display control unit 32 displays a frame in the moving image on the display unit 15, the time of the frame matching the designated time and date information.

Thus, even if the image corresponding to the designated time and date information is a moving image, it is possible to show the user the image (still image) corresponding to the time and date information designated by the user.

It is conceivable that the plurality of images is divided into groups, and, in a case where the image corresponding to the designated time and date information is an image in a group, the image search unit 33 determines that the image having the earliest imaging time among the images in the group including the image corresponding to the designated time and date information is the search result.

Thus, it is possible to retrieve the first image from a group of continuously captured images.

It is conceivable that the plurality of images includes one or more grouped images, and, in a case where the image corresponding to the designated time and date information is an image in a group, the image search unit 33 determines that the image having the imaging time closest to the designated time and date information among the images in the group including the image corresponding to the designated time and date information is the search result.

Thus, it is possible to display an image that the user is likely to desire most among the images in a group of continuously captured images.

It is conceivable that the plurality of images include one or more grouped images, and, in a case where the image corresponding to the designated time and date information is an image in a group, the image search unit 33 determines that the imaging having the earliest imaging time and the image having the imaging time closest to the designated time and date information among the images in the group including the image corresponding to the designated time and date information are the search result.

Thus, it is possible to display, side by side, the first image and the image the user is likely to desire most among the images in a group of continuously captured images.

It is conceivable that the display control unit 32 simultaneously displays the image whose imaging time is the closest to the designated time and date information as a main image, and displays the image whose imaging time is the earliest as a sub image.

Thus, it is possible to display, in a more easy-to-view manner, the first image and the image the user is likely to desire most among the images in a group of continuously captured images.

It is conceivable that the image search unit 33 searches for an image corresponding to the time and date information designated by an external device.

Thus, by an operation from the external device, an image stored in the imaging device 1 can be transmitted to the external device.

It is conceivable that information indicating an imaging condition is associated with an image and is stored in the image, and the image search unit 33 determines that one of the images having the same imaging condition as the imaging condition associated with the image corresponding to the designated time and date information is the search result.

Thus, it is possible to retrieve a desired image from a group of continuously captured images.

It is conceivable that the image search unit 33 determines that the image whose imaging time is the earliest among the images having the same imaging condition as the imaging condition associated with the image corresponding to the designated time and date information is the search result.

Thus, it is possible to retrieve the first image from a group of continuously captured images.

The image search unit 33 can search for an image by a different method, depending on the input accuracy of the designated time and date information.

Thus, it is possible to conduct a specific search after performing a rough search at first, and provide a user interface with an increased user-friendliness.

It is conceivable that, after searching for an image with time and date information of a relatively low input accuracy, the image search unit 33 searches for an image with time and date information of a relatively high input accuracy on the basis of the result of the previous search.

Thus, it is possible to conduct a specific search after performing a rough search at first, and provide a user interface with an increased user-friendliness.

It is conceivable that the display control unit 32 displays, on the display unit, a time and date entry image for prompting the user to input time and date information by a touch operation.

Thus, it is possible to provide a user interface designed for the user to intuitively input time and date information.

Further, by an information processing method, an information processing device searches for an image corresponding to designated time and date information among a plurality of images stored and associated with imaging times, and displays the retrieved image on the display unit.

Also, a program causes a computer to function as: an image search unit that searches for an image corresponding to designated time and date information among a plurality of images stored and associated with imaging times; and a display control unit that displays, on a display unit, the image retrieved by the image search unit.

With such an information processing method and program, effects similar to those of the information processing device can be achieved.

Note that such a program can be recorded beforehand in an HDD as a recording medium built in a device such as a personal computer, a ROM or a flash memory in a microcomputer having a CPU, or the like.

Alternatively, the program can also be temporarily or permanently stored (recorded) in a removable recording medium such as a flexible disc, a compact disc read only memory (CD-ROM), a magnet optical (MO) disc, a DVD, a Blu-ray disc, a magnetic disc, a semiconductor memory, a memory card, or the like. Such a removable recording medium can be provided as so-called packaged software. Further, the program can also be installed from a removable recording medium into a personal computer or the like, or can be downloaded from a download site via a network such as a local area network (LAN) or the Internet.

Furthermore, the effects described in the present specification are merely examples and are not limited to any particular effects, and there may be some other effects.

6. Present Technology

Note that the present technology can also adopt the following configurations.

(1)

An information processing device including:

an image search unit that searches for an image corresponding to designated time and date information among a plurality of images that is stored and is associated with imaging times; and a display control unit that displays, on a display unit, an image based on a result of the search performed by the image search unit.

(2)

The information processing device according to (1), in which, in a case where there is a plurality of images associated with an imaging time that matches the designated time and date information, the image search unit determines that an image having an earliest imaging time among the plurality of associated images is the result of the search.

(3)

The information processing device according to (1) or (2), in which, in a case where there are no images associated with an imaging time that matches the designated time and date information, the image search unit determines that an image having an imaging time closest to the designated time and date information is the result of the search.

(4)

The information processing device according to any one of (1) to (3), in which the display control unit displays, on the display unit, a time and date entry image for prompting a user to input the time and date information, and displays the time and date entry image, when displaying an image retrieved by the image search unit.

(5)

The information processing device according to any one of (1) to (4), in which the display control unit displays, on the display unit, a time and date entry image for prompting a user to input the time and date information, and displays, in the time and date entry image, the imaging time associated with the image displayed on the display unit.

(6)

The information processing device according to any one of (1) to (5), in which the display control unit displays, on the display unit, a difference time and date entry image for prompting an input of a difference from the imaging time associated with the image displayed on the display unit, and displays the difference time and date entry image when displaying an image retrieved by the image search unit.

(7)

The information processing device according to any one of (1) to (6), in which the plurality of images includes a still image and a moving image, and, in a case where the image corresponding to the designated time and date information is the moving image, the display control unit displays, on the display unit, a first frame in the moving image.

(8)

The information processing device according to any one of (1) to (7), in which the plurality of images includes a still image and a moving image, and, in a case where the image corresponding to the designated time and date information is the moving image, the display control unit displays a frame in the moving image on the display unit, a time of the frame matching the designated time and date information.

(9)

The information processing device according to any one of (1) to (8), in which the plurality of images is divided into groups, and, in a case where the image corresponding to the designated time and date information is an image in a group, the image search unit determines that an image having an earliest imaging time among images in the group including the image corresponding to the designated time and date information is the result of the search.

(10)

The information processing device according to any one of (1) to (9), in which the plurality of images includes at least one image belonging to a group, and, in a case where the image corresponding to the designated time and date information is an image belonging to a group, the image search unit determines that an image having an imaging time closest to the designated time and date information among images in the group including the image corresponding to the designated time and date information is the result of the search.

(11)

The information processing device according to any one of (1) to (10), in which the plurality of images includes at least one image belonging to a group, and, in a case where the image corresponding to the designated time and date information is an image belonging to a group, the image search unit determines that an image having an earliest imaging time and an image having an imaging time closest to the designated time and date information among images in the group including the image corresponding to the designated time and date information are the result of the search.

(12)

The information processing device according to (11), in which the display control unit displays the image having the imaging time closest to the designated time and date information as a main image, and displays the image having the earliest imaging time as a sub image.

(13)

The information processing device according to any one of (1) to (12), in which the image search unit searches for an image corresponding to time and date information designated by an external device.

(14)

The information processing device according to any one of (1) to (13), in which information indicating an imaging condition is associated with the image and is stored in the image, and the image search unit determines that one of images having the same imaging condition as the imaging condition associated with the image corresponding to the designated time and date information is the result of the search.

(15)

The information processing device according to (14), in which the image search unit determines that an image having an earliest imaging time among the images having the same imaging condition as the imaging condition associated with the image corresponding to the designated time and date information is the result of the search.

(16)

The information processing device according to any one of (1) to (15), in which the image search unit searches for an image by a different method, depending on an input accuracy of the designated time and date information.

(17)

The information processing device according to (16), in which, after searching for an image with time and date information of a relatively low input accuracy, the image search unit searches for an image with time and date information of a relatively high input accuracy, on the basis of the result of the previous search.

(18)

The information processing device according to any one of (1) to (17), in which the display control unit displays, on the display unit, a time and date entry image for prompting a user to input the time and date information by a touch operation.

(19)

An information processing method implemented by an information processing device the information processing method including:

searching for an image corresponding to designated time and date information among a plurality of images that is stored and is associated with imaging times, and displaying a retrieved image on a display unit.

(20)

A program for causing a computer to function as:

an image search unit that searches for an image corresponding to designated time and date information among a plurality of images that is stored and is associated with imaging times; and a display control unit that displays, on a display unit, an image retrieved by the image search unit.

REFERENCE SIGNS LIST

1 Imaging device
4 Backside monitor
6 Manipulation element
15 Display unit
17 Control unit
32 Display control unit
33 Image search unit

The invention claimed is:

1. An information processing device comprising:
a non-transitory memory storing a program, and
at least one processor configured to execute the program to perform operations comprising:
searching for an image corresponding to designated time and date information among a plurality of images that is stored and is associated with imaging times, wherein the plurality of images includes a still image and a moving image;
identifying a determined image based on a result of the searching for the image;
in a case where the determined image is the moving image, identifying a frame in the moving image having a time that matches the designated time and date information; and
displaying the identified frame.

2. The information processing device according to claim 1, wherein the operations further comprise:
in a case where multiple images are associated with an imaging time that matches the designated time and date information,
identifying the determined image as a corresponding image having an earliest imaging time among the multiple images.

3. The information processing device according to claim 1, wherein,
in a case where there are no images associated with an imaging time that matches the designated time and date information,
identifying the determined image as a corresponding image having an imaging time closest to the designated time and date information.

4. The information processing device according to claim 1, wherein the operations further comprise:
displaying a time and date entry image for prompting a user to input the time and date information; and
displaying the time and date entry image when displaying the determined image.

5. The information processing device according to claim 1, wherein the operations further comprise:
displaying a time and date entry image for prompting a user to input the time and date information; and
displaying, in the time and date entry image, the imaging time associated with the determined image.

6. The information processing device according to claim 1, wherein the operations further comprise:
displaying a difference time and date entry image for prompting an input of a difference from the imaging time associated a displayed image; and
displaying the difference time and date entry image when displaying the determined image.

7. The information processing device according to claim 1, wherein the plurality of images is divided into groups, and the operations further comprise:
in a case where corresponding images belong to a group,
identifying the determined image as a corresponding image having an earliest imaging time among images in the group that correspond to the designated time and date information.

8. The information processing device according to claim 1, wherein the plurality of images includes at least one image belonging to a group, and the operations further comprise:
in a case where corresponding images belong to a group,
identifying the determined image as a corresponding image having an imaging time closest to the designated time and date information among images in the group.

9. The information processing device according to claim 1, wherein the plurality of images includes at least one image belonging to a group, and, the operations further comprise:
in a case where corresponding images to the designated time and date information belong to a group,
identifying the determined image as a corresponding image having an earliest imaging time and an imaging time closest to the designated time and date information among images in the group.

10. The information processing device according to claim 9, wherein the operations further comprise:
displaying a corresponding image having the imaging time closest to the designated time and date information as a main image, and displaying another corresponding image having the earliest imaging time as a sub image.

11. The information processing device according to claim 1, wherein the operations further comprise:
searching for an image corresponding to time and date information designated by an external device.

12. The information processing device according to claim 1, wherein information indicating an imaging condition is associated and stored in respective images, and the operations further comprise:
identifying the determined image as a corresponding image having a matching imaging condition.

13. The information processing device according to claim 12, wherein the operations further comprise:
identifying the determined image as a corresponding image having an earliest imaging time among images having a same imaging condition.

14. The information processing device according to claim 1, wherein the operations further comprise:
searching for an image by respective different methods depending on an input accuracy of the designated time and date information.

15. The information processing device according to claim 14, wherein the operations further comprise:
after a first search for an image with time and date information of a relatively low input accuracy,
searching for an image with time and date information of a relatively high input accuracy, on a basis of a result of the first search.

16. The information processing device according to claim 1, wherein the operations further comprise:
displaying a time and date entry image for prompting a user to input the time and date information by a touch operation.

17. An information processing method implemented by an information processing device, the information processing method comprising:

searching for an image corresponding to designated time and date information among a plurality of images that is stored and is associated with imaging times, wherein the plurality of images includes a still image and a moving image;

identifying a determined image based on a result of the searching for the image;

in a case where the determined image is the moving image, identifying a frame in the moving image having a time that matches the designated time and date information; and displaying the identified frame.

18. A non-transitory computer readable medium storing a program, the program being executable by a processor to perform operations comprising:

searching for an image corresponding to designated time and date information among a plurality of images that is stored and is associated with imaging times, wherein the plurality of images includes a still image and a moving image;

identifying a determined image based on a result of the searching for the image;

in a case where the determined image is the moving image, identifying a frame in the moving image having a time that matches the designated time and date information; and displaying the identified frame.

* * * * *